US009678696B2

(12) United States Patent
Martin et al.

(10) Patent No.: US 9,678,696 B2
(45) Date of Patent: Jun. 13, 2017

(54) DISTRIBUTED PRINTING SYSTEM SET VIA PRINTER DRIVER

(71) Applicant: KYOCERA Document Solutions Inc., Osaka (JP)

(72) Inventors: Michael Martin, Concord, CA (US); Dilinur Wushour, Concord, CA (US); Sang Yoon Lee, Concord, CA (US); Arthur Alacar, Concord, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/600,136

(22) Filed: Jan. 20, 2015

(65) Prior Publication Data

US 2016/0210091 A1 Jul. 21, 2016

(51) Int. Cl.
*G06F 3/12* (2006.01)
*G06K 15/00* (2006.01)

(52) U.S. Cl.
CPC ............ *G06F 3/1241* (2013.01); *G06F 3/121* (2013.01); *G06F 3/1205* (2013.01); *G06F 3/1206* (2013.01); *G06F 3/1217* (2013.01); *G06F 3/1234* (2013.01); *G06F 3/1239* (2013.01); *G06F 3/1275* (2013.01); *G06F 3/1288* (2013.01); *G06F 3/1292* (2013.01); *G06K 15/007* (2013.01); *G06K 15/408* (2013.01)

(58) Field of Classification Search
None
See application file for complete search history.

(56) References Cited

U.S. PATENT DOCUMENTS

| | | | | |
|---|---|---|---|---|
| 8,456,665 | B2* | 6/2013 | Ferlitsch | G06F 3/121 358/1.13 |
| 2003/0007818 | A1* | 1/2003 | Kato | 400/61 |
| 2003/0103236 | A1* | 6/2003 | Kato | 358/1.15 |
| 2003/0117638 | A1* | 6/2003 | Ferlitsch | G06F 3/1204 358/1.13 |
| 2004/0042042 | A1* | 3/2004 | Utsunomiya | G06F 3/1205 358/1.15 |
| 2004/0158654 | A1* | 8/2004 | Shima | H04N 1/32545 710/8 |
| 2004/0184105 | A1* | 9/2004 | Ferlitsch | H04N 1/00931 358/2.1 |
| 2005/0088681 | A1* | 4/2005 | Hosoda | 358/1.14 |
| 2006/0061817 | A1* | 3/2006 | Kakigi | G06F 3/1205 358/1.15 |
| 2007/0229880 | A1* | 10/2007 | Harmon et al. | 358/1.15 |
| 2010/0079788 | A1* | 4/2010 | Kodera | 358/1.15 |

* cited by examiner

*Primary Examiner* — Miya J Williams
(74) *Attorney, Agent, or Firm* — McDonnell Boehnen Hulbert & Berghoff LLP

(57) ABSTRACT

Example systems and related methods may relate to distributed printing. A client device associated with a plurality of candidate print devices can receive a request for distributed printing. The client device can determine a plurality of print devices from among the plurality of candidate print devices. Each print device in the plurality of print devices can be configured to service at least part of the request for distributed printing. The client device can determine a plurality of print job portions that collectively satisfy the request for distributed printing. Then, for each designated print device of the plurality of print devices, the client device can: allocate one or more print job portions to the designated print device and provide the allocated one or more print job portions to the designated print device.

21 Claims, 18 Drawing Sheets

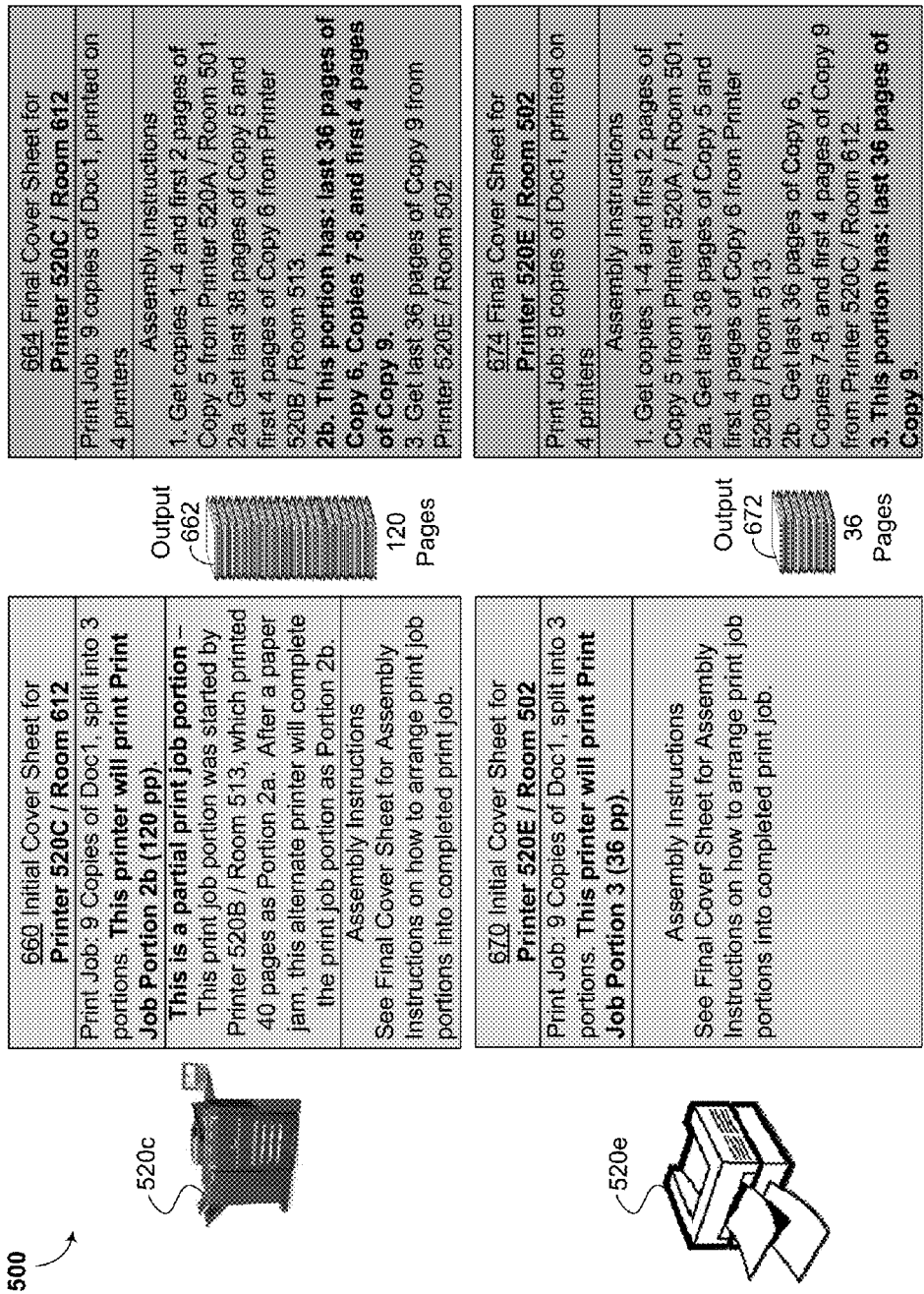

DISTRIBUTED PRINTING SYSTEM SET VIA PRINTER DRIVER

BACKGROUND

Printing devices have increased in number and geographic footprint throughout the world and have become increasingly connected to networks. These networks can include a print server. Typically, when one or more documents and/or other print data are scheduled to be printed, the print data is either directly sent to one print device, or sent to a print server.

If the print data is sent directly to one print device, the print device completes a print job for printing the print data. If the print data is sent to a print server, the print server selects one or more print devices for the print job. Then, the print server sends the print data to the selected print devices for printing. The selected print devices print the print data and complete the print job.

SUMMARY

In a first aspect, a method is provided. A client device receives a request for distributed printing, where the client device is associated with a plurality of candidate print devices. The client device determines a plurality of print devices from among the plurality of candidate print devices, where each print device in the plurality of print devices is configured to service at least part of the request for distributed printing. The client device determines a plurality of print job portions, where the plurality of print job portions collectively satisfy the request for distributed printing. For each designated print device of the plurality of print devices, the client device at least allocates one or more print job portions to the designated print device and provides the allocated one or more print job portions to the designated print device.

In another aspect, a system is provided. The system includes a plurality of candidate print devices and a client device. The client device includes one or more processors and data storage, the data storage including computer-readable instructions that, when executed by the one or more processors, cause the client device to perform functions. The functions include: receiving a request for distributed printing; determining a plurality of print devices from among the plurality of candidate print devices, where each print device in the plurality of print devices is configured to service at least part of the request for distributed printing; determining a plurality of print job portions, where the plurality of print job portions collectively satisfy the request for distributed printing; and for a designated print device of the plurality of print devices, at least: allocating one or more print job portions to the designated print device and providing the allocated one or more print job portions to the designated print device.

In another aspect, an article of manufacture is provided. The article of manufacture includes computer-readable instructions that, when executed by one or more processors of a client device associated with a plurality of candidate print devices, cause the client device to perform functions. The functions include: receiving a request for distributed printing; determining a plurality of print devices from among the plurality of candidate print devices, where each print device in the plurality of print devices is configured to service at least part of the request for distributed printing; determining a plurality of print job portions, where the plurality of print job portions collectively satisfy the request for distributed printing; and for a designated print device of the plurality of print devices, at least: allocating one or more print-job portions to the designated print device and providing the allocated one or more print job portions to the designated print device.

Other aspects, embodiments, and implementations will become apparent to those of ordinary skill in the art by reading the following detailed description, with reference where appropriate to the accompanying drawings.

BRIEF DESCRIPTION OF THE FIGURES

FIGS. 6F and 6G illustrate print device output in the scenario of FIG. 5, according to an example embodiment.

DETAILED DESCRIPTION

Figure 1:
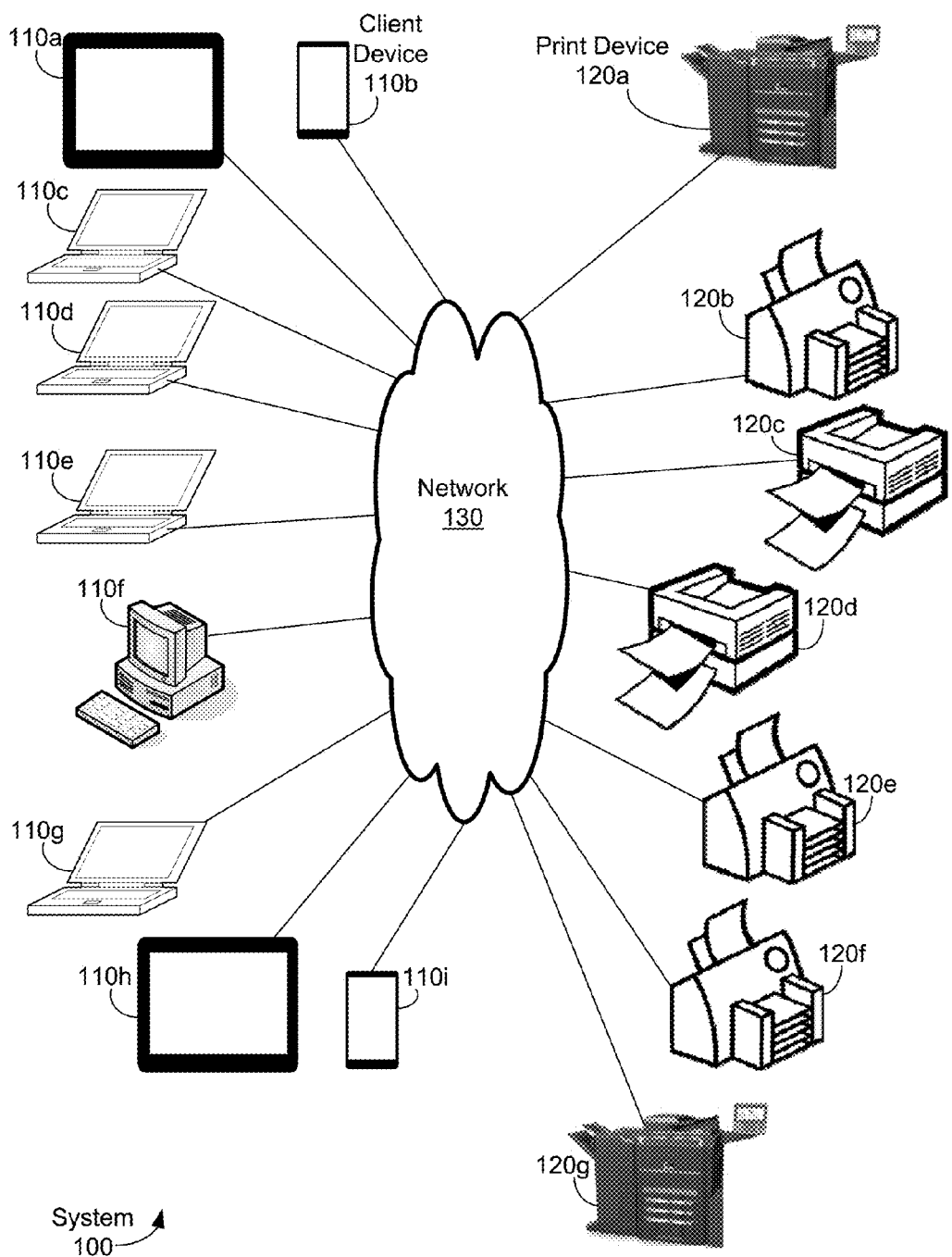
FIG. 1 is a diagram illustrating a system, according to an example embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

This application relates to a distributed printing system that can specify one or more print devices as distributed destinations and send print data to the specified print devices. The distributed printing system can include a client device, such as a personal computer or other computing device, configured to connect to a number of print devices via a computer network. The client device can distribute print data to some or all of the number of print devices for print devices to complete a print job in parallel, and so reduce printing time. The client device can communicate directly with the print devices without using an intermediate device, such as a print server. Rather, on the client device, a port monitor can communicate with the printers through the network.

The client device can split a print job into several print job portions based on functions, characteristics, status, and/or other criteria of print devices connected to the client device via a network. For example, suppose a network has three connected print devices: print device A, print device B, and print device C. Print device A can print in monochrome only, supports A4-sized paper solely, and has a finisher device for stapling, duplexing, etc. Print device B can print in monochrome only, supports A3, A4, and letter-sized paper, and does not have a finisher device. And print device C can print in monochrome or color, supports A4-sized paper solely, and does not have a finisher device. So, in this network, some print jobs can be sent to only one printer; e.g., print jobs that require finishing can only be sent to print device A, print jobs that use A3 or letter-sized paper can only be sent to print device B, and color print jobs can only be sent to print device C. However, print jobs that utilize common features—monochrome printing on A4 paper—can be split and sent to some or all of print devices A, B, and C to increase printing speed.

Continuing this example, suppose that a client device of the distributed printing system had a print job that required monochrome printing on A4 paper. However, at the time of print job submission, suppose that print device B had an error (or fault) condition and so was inoperative. Example error conditions for a print device include, but are not limited to, the print device: having a paper jam, being disconnected and/or taken offline from a network, having a mechanical issue, running low or out of paper, and/or running low or out of toner/ink. Then, the client device can take the error condition of print device B into account and only use print devices A and C to print the print job.

A user of the client device can choose either distributed printing; e.g., printing one print job using multiple print devices or single printing, e.g., printing one print job using only one print device. The user can enable a default setting to use distributed printing; e.g., using a printer driver for all print jobs, as part of user-specific data, such as user profile, on a per-application basis. Also, the user can enable or disable distributed printing on a printer driver or via an application each time he/she has a print job.

A number of options for distributed printing can be provided. For example, a user may choose splitting the print job on a per-copy or per-page basis when a distributed printing feature is enabled. Splitting the print job on a per-copy basis distributes whole copies of a document to a designated printer, while splitting the print job on a per-page basis allows for splitting a copy of a document to be printed by multiple printers. For example, if a print job included three copies of a ten-page document to be printed by two identical print devices, then, on a per-copy basis, one print device would likely print one copy and the other print device would likely print the other two copies; while on a per-page basis, each print device could print 15 pages of the 30-page print job by splitting one copy between the printers.

Print jobs can be distributed on an equal page or an equal time basis. As another example, suppose the print job included two copies of a fifteen-page printable item to be printed by two print devices—print device "Faster" that can print 30 pages per minute (PPM), and print device "Slower" that can print 15 PPM. On an equal-page basis, both print devices would receive 15 pages of the print job, and the job would take about one minute of printing time while print device Slower printed 15 pages at 15 PPM. On an equal-time basis, since print device Faster is twice as fast as print device Slower, print device Faster would receive 20 pages of the 30 page print job, which is twice as many as the 10 pages that print device Slower would receive. In this case, the amount of printing time would be reduced to about 40 seconds ($\frac{2}{3}$ of a minute), as print device Faster will take 40 seconds to print 20 pages at 30 PPM and print device Slower will take 40 seconds to print 10 pages at 15 PPM.

A distributed print job can also include instructions on how to assemble the print job once printed. For example, in the equal-time example above, print device Faster prints 20 pages of a print job involving two copies of a 15-page printable item, and print device Slower prints the remaining 10 pages. Then, the client device can display and/or one or both print devices can print instruction sheet(s) indicating how to assemble the combined print job; e.g., get the one whole copy and part of the second copy from print device Faster and then get the remainder of the second copy from print device Slower. Other options for distributed printing are possible as well.

The herein-described distributed printing system can enable the client device to use a number of printing devices to provide higher-speed printing. Further, implementing a distributed printing solution that does not involve a print server is more flexible, as only client devices of the distributed printing system have software specifically for distributed printing. Eliminating the use of print server software for distributed printing can simplify software distribution, as only client devices are updated when expanding distributed printing features and/or fixing issues in distributed printing software.

II. System Examples

FIG. 1 is a schematic block diagram illustrating a system 100, according to an example embodiment. The system 100 can include client devices 110a, 110b, 110c, 110d, 110e, 110f, 110g, 110h, and 110i, and print devices 120a, 120b, 120c, 120d, 120e, 120f, and 120g that are interconnected via network 130. In some examples, system 100 can have more, fewer, and/or different types of client devices and/or print devices than indicated in FIG. 1.

In an example embodiment, some or all print devices 120a-120g can be connected to some or all client devices 110a-110i through one or more, possibly different, network protocols. Data can be transmitted between client devices 110a-110i and print devices 120a-120g over wired and/or wireless links between client devices, print devices, and network 130. The format of each respective data transmission between devices in system 100 can include one or more of a variety of different formats including: text formats, image formats, extensible mark-up language (XML), database tables, or another original or flat file format.

Communications between the client devices and print devices can include: client devices 110a-110i sending data for print jobs and/or print job portions to print devices 120a-120g for printing and print devices 120a-120g sending alert, status, error, and/or other messages to client devices 110a-110i to inform the client devices about error or other conditions of the print devices; e.g., idle, printing, sleeping, paper jam, low or out of paper, low or out of toner/ink, etc. Other communications between one or more client devices and one or more print devices are possible as well.

Figure 2A:
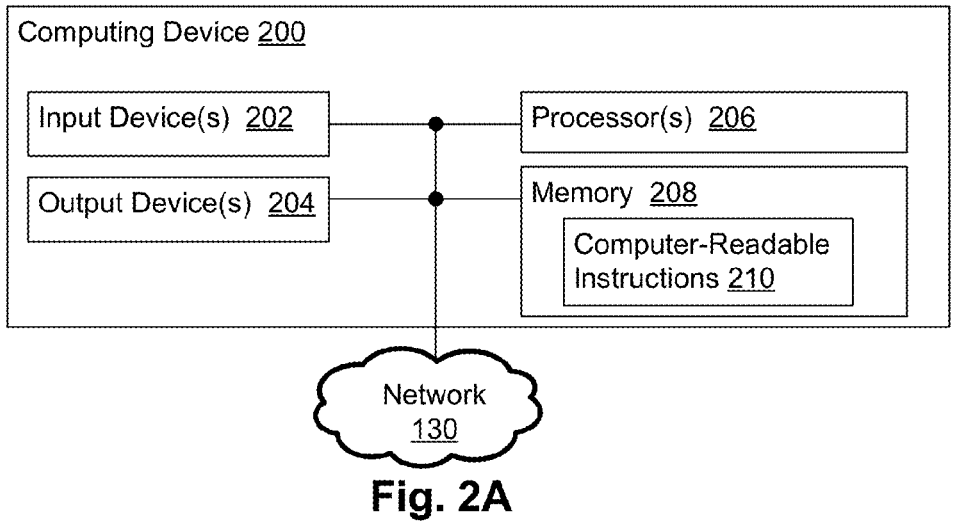
FIG. 2A is a schematic block diagram illustrating a computing device, according to an example embodiment.

FIG. 2A is a schematic block diagram illustrating computing device 200, according to an example embodiment. In some embodiments, computing device 200 can be configured to perform one or more herein-described functions of client devices 110a-110i, 220, 510, and 810, print devices 120a-120g, 520a-520e, 820a, 820b, and 820c, methods 300, 400, and 900, applications 512 and 812, dialogs 610 and 610a, and/or herein-described functionality related to scenarios 500 and 800.

Computing device 200 can include one or more input devices 202, one or more output devices 204, one or more processors 206 and memory 208. Input devices 202 can include user input devices, network input devices, sensors, and/or other types of input devices. For example, input devices 202 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 130, and/or wireless network receivers and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 130. Sensors can include devices configured to measure conditions in an environment of computing device 200 and provide data about that environment, such data including, but not limited to, location data, velocity (speed, direction) data, acceleration data, and other data about the environment for computing device 200. Example sensors include, but are not limited to, GPS sensor(s), location sensors(s), gyroscope(s), accelerometer(s), magnetometer(s), camera(s), light sensor(s), infrared sensor(s), and microphone(s). Other input devices 202 are possible as well.

Output devices 204 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 130, and/or wireless network transmitters and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 130. Other types of output devices can include, but are not limited to, vibration devices, haptic feedback devices, and non-visible light emission devices; e.g., devices that emit infra-red or ultra-violet light. Other output devices 204 are possible as well.

Processors 206 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). Processors 206 can be configured to execute computer-readable program instructions 210 that are contained in memory 208 and/or other instructions as described herein.

Memory 208 can be non-transitory machine-readable storage configured to store data and/or instructions. In particular, memory 208 can store machine-readable instructions 210 that, when executed by processor(s) 206, can cause a computing device to perform functions, such as but not limited to, functions of herein-described devices, networks, methods, features, and scenarios.

Figure 2B:
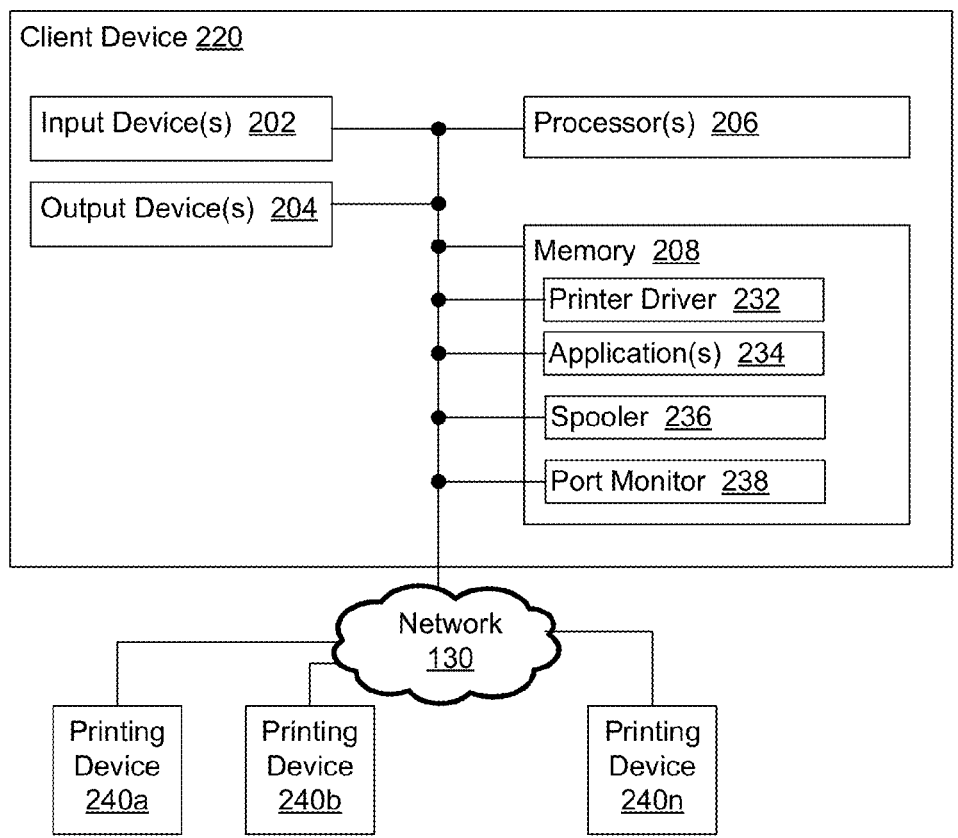
FIG. 2B is a schematic block diagram illustrating a network connecting a client device and a plurality of print devices, according to an example embodiment.

FIG. 2B is a schematic block diagram illustrating network 130 connecting client device 220 and a plurality of print devices 240a, 240b . . . 240n, according to an example embodiment. Client device 220 is an example of computing device 210 having input devices 202, output devices 204, processors 206, and memory 208. Memory 208 of client device 220 stores machine-readable instructions and/or data for software, such as, but not limited to printer driver 232, one or more applications 234, spooler 236, and port monitor 238. In some embodiments, a smaller or larger plurality of print devices can be connected to network 130, and therefore to client device 220, than shown in FIG. 2B.

Printer driver 232 can be configured to allow client device 220 to communicate with one or more of print devices 240a, 240b . . . 240n (via network 130) that convert print data; e.g., information to be printed from a format used by client device 220 to a format usable by one or more of print devices 240a, 240b . . . 240n for printing the print data as output. In some embodiments, printer driver 232 can provide a user interface, such as a dialog or other user interface object, to enable review, selection, and/or modification of various parameters, such as by a user of client device 210, associating with printing a print job having print data; e.g., one or more print devices to print the print job, copies to be printed, print features, finishing for the print job, etc. In some embodiments, print devices 240a, 240b . . . 240n can be different types of printing devices; e.g., have different manufacturers, different models, and/or different versions of software/firmware. In these embodiments, client device 220 can have multiple printer drivers 232 with at least one printer driver for each different type of printing device connected to client device 220.

Applications 234 can be software that, when executed by client device 220, enables client device 220 to perform various tasks. Example tasks include, but are not limited to, word processing, document review, interacting with networks such as the Internet, playing and/or generating images, audio and/or video information, developing software, financial planning, spreadsheet operations, calculations, games, communications, and computer administration. Spooler 236 can be software that, when executed by client device 220, is configured to order print jobs by temporarily storing print data and sending print data to a print device, such as one of print devices 240a, 240b . . . 240n, when the print device is active and waiting to process (print) the print data.

Port monitor 238 can be software that, when executed by client device 220, establishes a communications path between spooler 236 and printer driver 232 and the kernel-mode port drivers that access I/O port hardware. Port monitors 238 can also manage and configure printer ports. Printer ports can be a physical connection between a print queue of print jobs managed by spooler 236 and a printer device; e.g., one of print devices 240a, 240b . . . 240n.

Port monitor 238 can then support one or more instances of one or more types of ports. For print queues representing multiple printer devices (through multiple ports), spooler 236 can then send a print job to a first available port or a specific port. If the port monitor indicates that the specific (or first available) port is busy or in error, spooler 236 can restore the print job to a print queue of the specified port or add the print job to another print queue of a port supported by port monitor 238. In some embodiments, port monitor 238 can be configured to split a print job among multiple ports, effectively sending the print job to multiple print devices.

In other embodiments, printer driver 232 can be configured to enable whether a print job is printed using single printing, or printing with only one print device, and distributed printing, or printing that can be performed by multiple printing devices. Data stored in memory 208 can store a default setting for either single printing or distributed printing, and this data can be used to determine default settings; e.g., a default setting for a user interface to printer driver 232. Other data can be stored in memory 208 related to functions, characteristics, and options of print devices 240a, 240b . . . 240n, a default primary printing device and/or default alternate printing devices, default groups of printing devices to be used during distributed printing; e.g., use a group including print devices 240a and 240n for distributed print jobs.

III. Example Distributed Printing Methods

Figure 3:
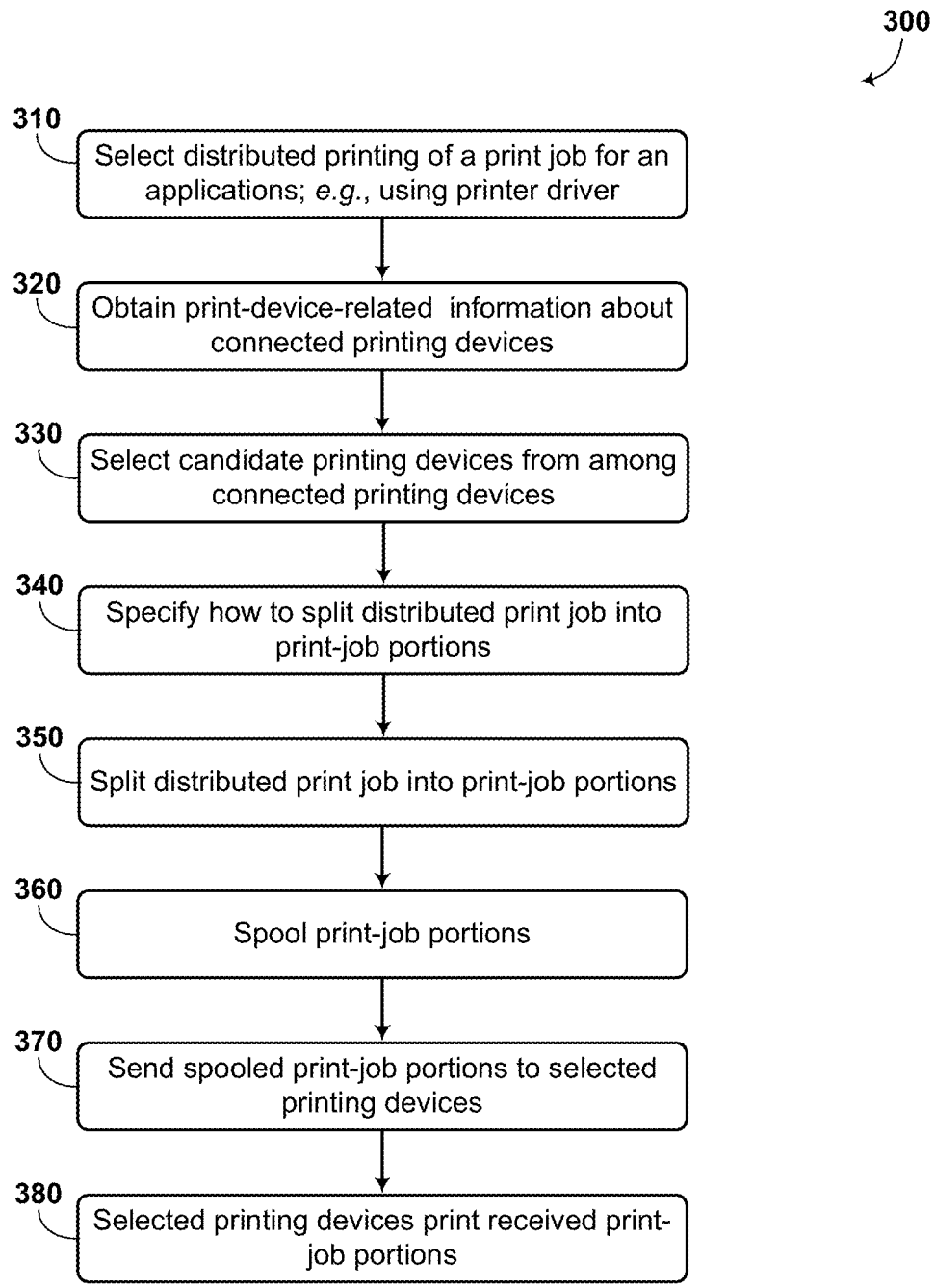
FIG. 3 is a flow diagram illustrating a method, according to an example embodiment.

FIG. 3 is a flow diagram illustrating method 300, according to an example embodiment. Method 300 is a method for distributed printing of a print job that can be carried out by a computing device connected to a plurality of printers; e.g., computing device 200 or client device 220.

Method 300 can begin at block 310, where a selection can be made to print a print job using distributed printing (as opposed to using single printing). For example, the selection can be made by a user of the computing device via a graphical user interface (GUI) enabling interaction with a printer driver, such as printer driver 232 of FIG. 2B. The GUI for the printer driver can be opened by using the GUI of the computing device to select a "Print" or other option of a software application, such as application 234 of FIG. 2B.

At block 320, the computing device can identify connected printing devices and obtain print-device-related information on the connected printing devices. The print-device-related information can include, but is not limited to, status information e.g., idle, busy, out of paper, toner low/out, etc., print device location, print device manufacturer, print device model, print device firmware, print device function information, and print device feature information.

At block 330, the computing device can select candidate printing devices for printing the distributed print job from the connected printing devices. In some embodiments, connected printing devices can be filtered out based on aspects of the print-device-related information; e.g., based on print device status, print device model/manufacturer/firmware, print device location, predefined user criteria, etc.

The computing device can provide some or all of the print-device-related information about the connected printing devices, perhaps after filtering, for possible selection for use in printing the distributed print job. For example, the computing device can provide the print-device-related information using the GUI of block 310. Then, the GUI can be used to select connected printing devices for use (or not for use) as candidate printing devices. The candidate printing devices can be print devices designated to print a print job portion of the distributed print job. In some embodiments, the computing device can select candidate printing devices from among the connected (and perhaps filtered) printing devices as candidate printing devices—in particular of these embodiments, print-device-related information may not be presented.

At block 340, the computing device can specify, or otherwise determine, how to split the distributed print job into print job portions. The distributed print job can be split according to the obtained print-device-related information and/or by user selection; e.g., user selection can be made via a GUI, such as the GUI of blocks 310 and 330. For example, the distributed print job can be split as an equal number of pages per printer; e.g., if the total distributed print job includes 120 pages to be printed among four print devices, then the distributed print job can be split into four equal-sized print-job portions of 30 pages.

As another example, if the print-device-related information includes page-per-minute (PPM) or similar information, the distributed print job can be split as an equal amount of estimated print time. Equation (1) below can be used to split a distributed print job having a number of pages NP to a number PR of print devices on a per-page basis so that each print device will print for a roughly equal amount of time:

$$P_i = NP * \frac{PPM_i}{\sum_{j=1}^{PR} PPM_j} \quad (1)$$

where:

$P_i$=the number of pages in the print job portion for print device i, with i∈[1, PR], PR=the number of print devices printing the distributed print job, NP=the number of pages in the distributed print job, and $PPM_i$=the number of pages per minute for print device i.

The ratio $$\frac{PPM_i}{\sum_{j=1}^{PR} PPM_j}$$

can be termed the page-volume ratio for print device i, where the numerator $PPM_i$ is a particular number of pages per unit time for particular print device i of a plurality of print devices 1 . . . PR, and where the denominator $\Sigma PPM$ is a total number of pages per unit time for the plurality of print devices 1 . . . PR.

For example, suppose the above-mentioned 120-page distributed print job was to be split among four printers having the following PPM values: 15, 20, 25, and 30. Then, in terms of Equation (1), PR=4, NP=120, $PPM_1$=15, $PPM_2$=20, $PPM_3$=25, and $PPM_4$=30, and so $\Sigma PPM$=90. Then, the number of pages in the print job portion for print device 1 (printing at a rate of 15 PPM) determined by Equation (1) is: $P_1$=120*(15/90)=20 pages. Similarly, for respective print devices 2, 3, and 4 printing at respective rates of 20, 25, and 30 PPM, the respective numbers of pages in the print job portions for respective print devices determined by Equation (1) are: $P_2$=120*(20/90)=27 pages (rounded up), $P_3$=120*(25/90)=33 pages (rounded down), and $P_4$=120*(30/90)=40 pages. The estimated amount of time to print the respective print job portion on each print device is about 1.35 minutes—print device 1 is estimated to take 20 pages/15 PPM=1.33 minutes, print device 2 is estimated to take 27/20=1.35 minutes, print device 3 is estimated to take 33/25=1.32 minutes, and print device 4 is estimated to take 40/30=1.33 minutes. Thus the example distributed print job should complete on all print devices at about the same time after approximately 1.35 minutes of printing.

Print job portions can be split on per-copy boundaries. For example, suppose a distributed print job having seven copies of a ten-page document (total 70 pages) was to be split between two print devices as equally as possible on (a) per-page boundaries and (b) per-copy boundaries. In example (a), each print device could print 70/2=35 pages, as the distributed print job was divided on per-page boundaries. In example (b), one print device would print 40 pages or four copies of the document, and the other print device would print 30 pages or three copies, as the distributed print job was divided on per-copy boundaries.

Print-job portions can be split via a GUI, such as the GUI discussed above in the context of blocks 310, 330, and this block. Print job portions can be allocated on a per-page basis, a per-copy basis, or a print volume ratio basis. A print volume ratio can be a percentage or ratio-based specification of a print job portion of the distributed print job. For example, suppose a distributed print job of 10 copies of a 30 page document for a total of 300 pages was to be allocated among three print devices via a GUI. Then, the GUI could be used to select a number of pages for each print job portion, a number of copies for each print job portion, or a print volume ratio/percentage of pages for each print-job portion. In this example, the GUI could be used to equivalently specify print job portions of: 150, 90, and 60 pages; 5, 3, and 2 copies; or 50%, 30%, and 20% print volume ratios. Other procedures for splitting distributed print jobs into print job portions are possible as well.

At block 350, the computing device can split the distributed print job into print-job portions as specified in block 340.

At block 360, the computing device can send the print-job portions to a spooler of the computing device, such as spooler 236.

At block 370, the spooler can send the print job portions to a port monitor of the computing device, such as port-monitor 238. The port monitor can send the respective print-job portions to the respective printing devices selected at block 330 to print the distributed print job.

At block 380, each print device can then print its respective print job portion, and so the distributed print job can be completed by the selected print devices.

In some embodiments, at block 370, the spooler can send the print job portions directly to the print devices; i.e., block 380 is not performed. In other embodiments, at block 360, the computing device can send the print job portions directly to the port monitor; i.e., block 370 is not performed. In still other embodiments, at block 360, the computing device can send the print-job portions directly to the print devices; i.e., blocks 370 and 380 are not performed.

Figure 4:
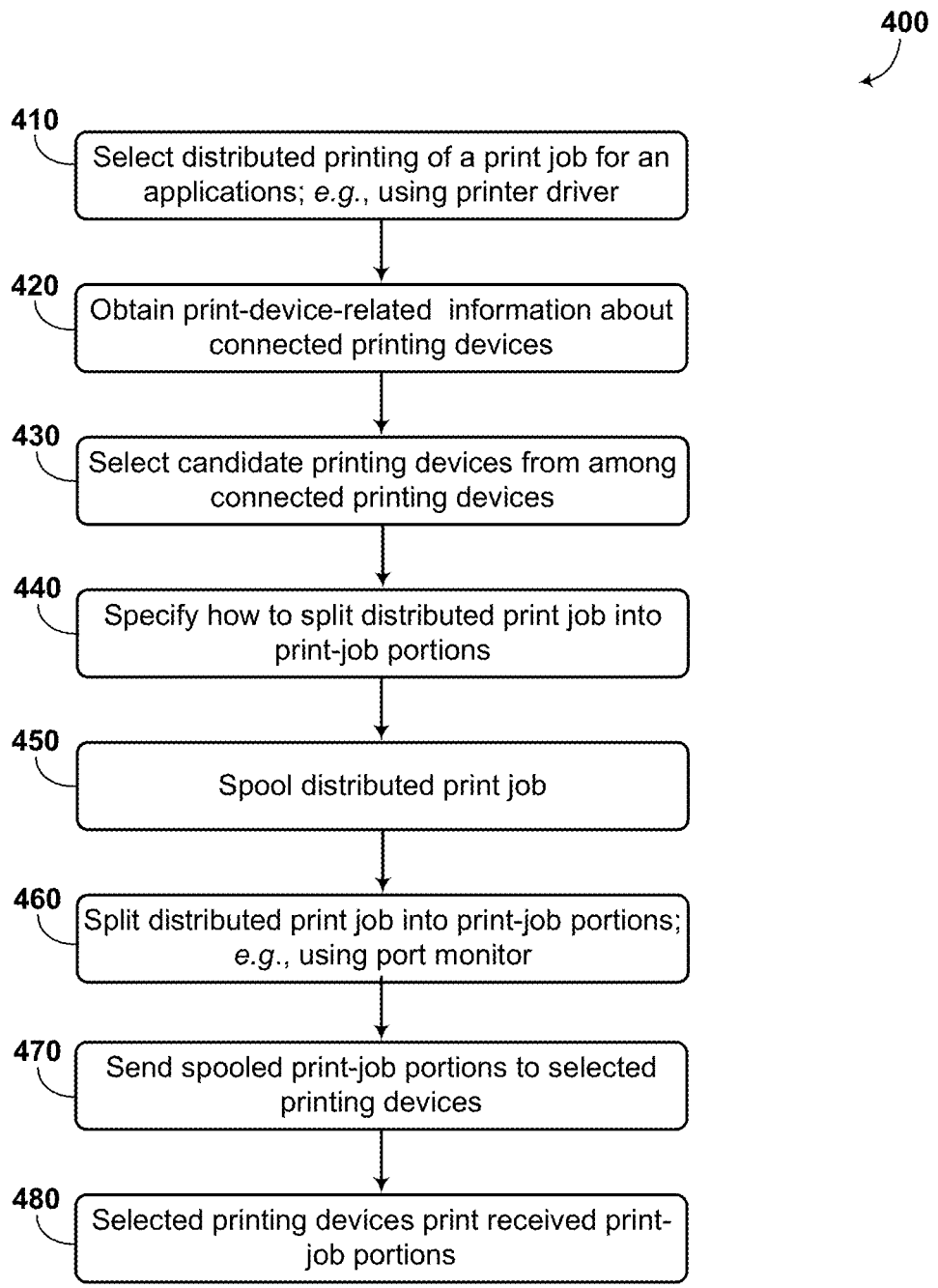
FIG. 4 is a flow diagram illustrating a method, according to an example embodiment.

FIG. 4 is a flow diagram illustrating method 400, according to an example embodiment. Method 400 is a method for distributed printing of a print job that can be carried out by a computing device connected to a plurality of printers; e.g., computing device 200 or client device 220.

Method 400 can begin at block 410, where a selection can be made to print a print job using distributed printing, such as discussed above in the context of block 310 of method 300 and FIG. 3.

At block 420, the computing device can identify connected printing devices and obtain print-device-related information on the connected printing devices, such as discussed above in the context of block 320 of method 300 and FIG. 3.

At block 430, the computing device can select candidate printing devices for printing the distributed print job from the connected printing devices, such as discussed above in the context of block 330 of method 300 and FIG. 3.

At block 440, the computing device can specify, or otherwise determine, how to split the distributed print job into print job portions, such as discussed above in the context of block 340 of method 300 and FIG. 3.

At block 450, the computing device can send the distributed print job to a spooler of the printing device, such as spooler 236.

At block 460, the spooler can send the distributed print job to a port monitor of the computing device, such as port monitor 238. The port monitor can then split the distributed print job into print job portions as specified in block 440.

At block 470, the spooler can send the print job portions to a port monitor of the computing device, such as discussed above in the context of block 370 of method 300 and FIG. 3.

At block 480, each print device can then print its respective print job portion, and so the distributed print job can be completed by the selected print devices, such as discussed above in the context of block 380 of method 300 and FIG. 3.

To compare methods 300 and 400: in method 300, the computing device splits the distributed print job into print job portions and then spools the print job portions, while in method 400, the computing device spools the distributed print job, the spooler forwards on the distributed print job onto the port monitor, and the port monitor splits the distributed print job into print job portions.

IV. Example Distributed Printing Scenarios

Figure 5:
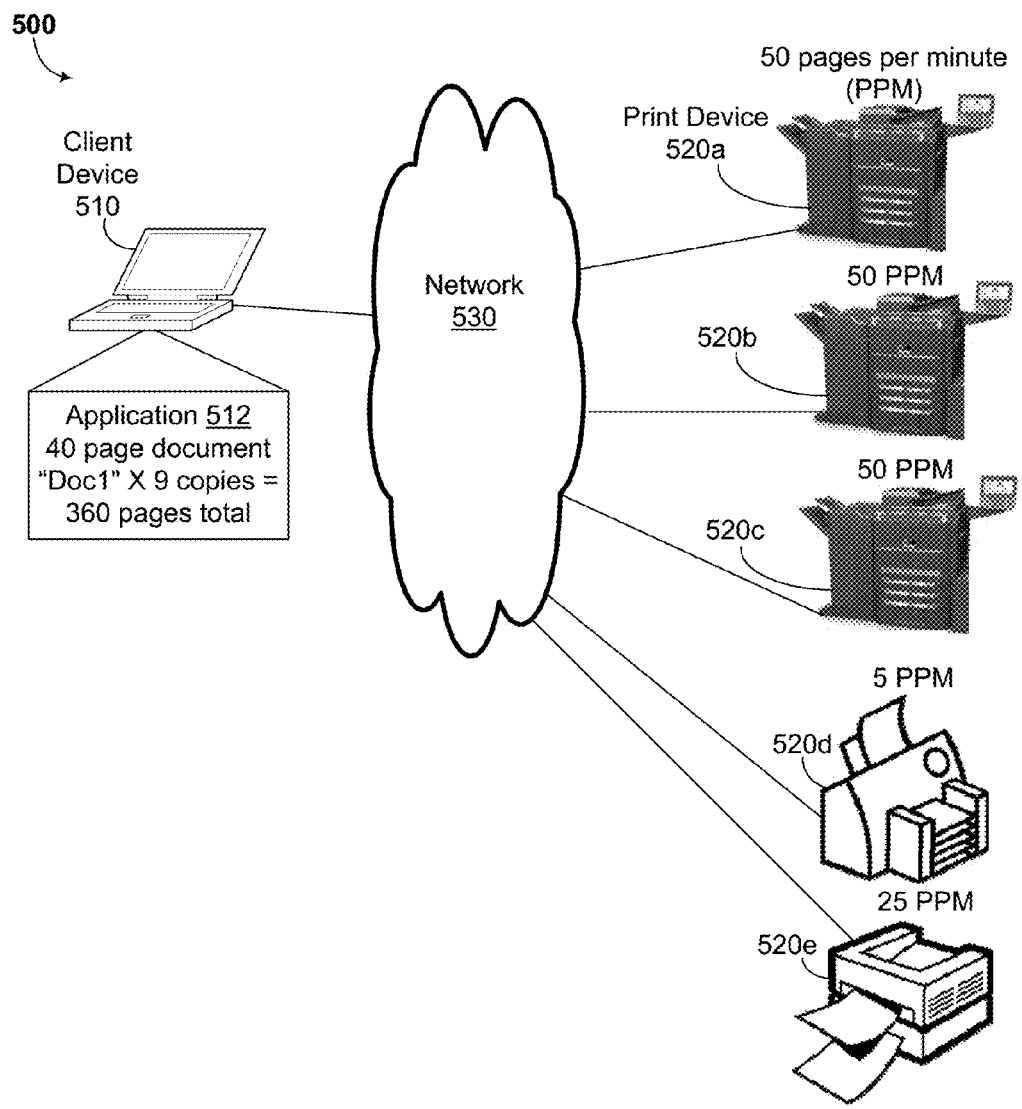
FIG. 5 is a diagram illustrating a system used in a scenario for printing output, according to an example embodiment.

FIG. 5 is a diagram illustrating a system used in scenario 500 for printing output, according to an example embodiment. Scenario 500 involves a system including client device 510 and print devices 520a, 520b, 520c, 520d, and 520e all interconnected via network 530.

In scenario 500, client device 510 is executing software application 512 to work with a 40-page document entitled "Doc1" which is printed twice during the scenario. Initially in scenario 500, a user of client device 510 would like to print nine copies of document Doc1, as a "9-copy" distributed print job. Later in scenario 500, a user of client device 510 would like to print twelve copies of document Doc1, as a "12-copy" distributed print job.

FIG. 5 shows estimated printing rate values for each print device: print devices 520a, 520b, and 520c can each print at a rate of 50 PPM, print devices 520d can print at a rate of 5 PPM, and print device 520e can print at a rate of 25 PPM. Table 1 below includes estimates of how long various combinations of print devices 520a-520e would take to print 360 pages:

TABLE 1

| Print Device(s) | Estimated Print Rate | Estimated Time to Print 360 Pages (in minutes) |
| --- | --- | --- |
| 520d | 5 PPM | 72 |
| 520e | 25 PPM | 14.4 |
| 520a | 50 PPM | 7.2 |
| 520a, 520b | 100 PPM | 3.6 |
| 520a, 520b, 520e | 125 PPM | 2.88 |
| 520a, 520b, 520d, 520e | 130 PPM | 2.77 |
| 520a, 520b, 520c, 520d, 520e | 180 PPM | 2 |

Therefore, in scenario 500, distributed printing using all five print devices can lead to an estimated speed up in printing the 360 page print job of up to 3.6 times over the fastest single print device and up to 36 times over the slowest single print rate.

Figure 6A:
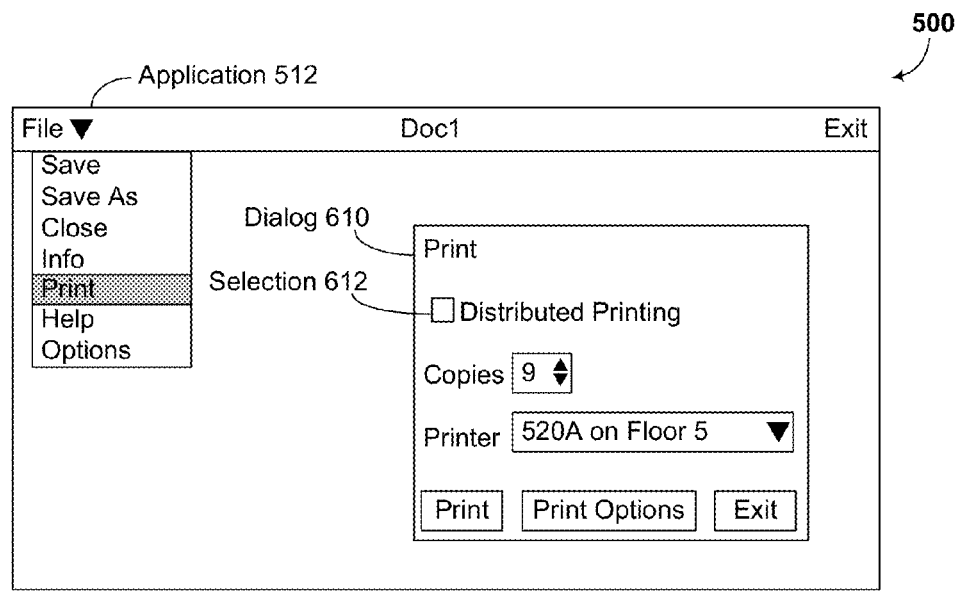
FIG. 6A shows a print dialog associated with an application in the scenario of FIG. 5, according to an example embodiment.

Scenario 500 continues with a user of client device 510 using application 512 to print the document Doc1. FIG. 6A shows a print dialog 610 associated with application 512 in scenario 500, according to an example embodiment. Dialog 610 includes selection 612 for distributed printing—the user of client device 510 can make selection 612 to use distributed printing to print the requested nine copies of the 40 page document Doc1.

Figure 6B:
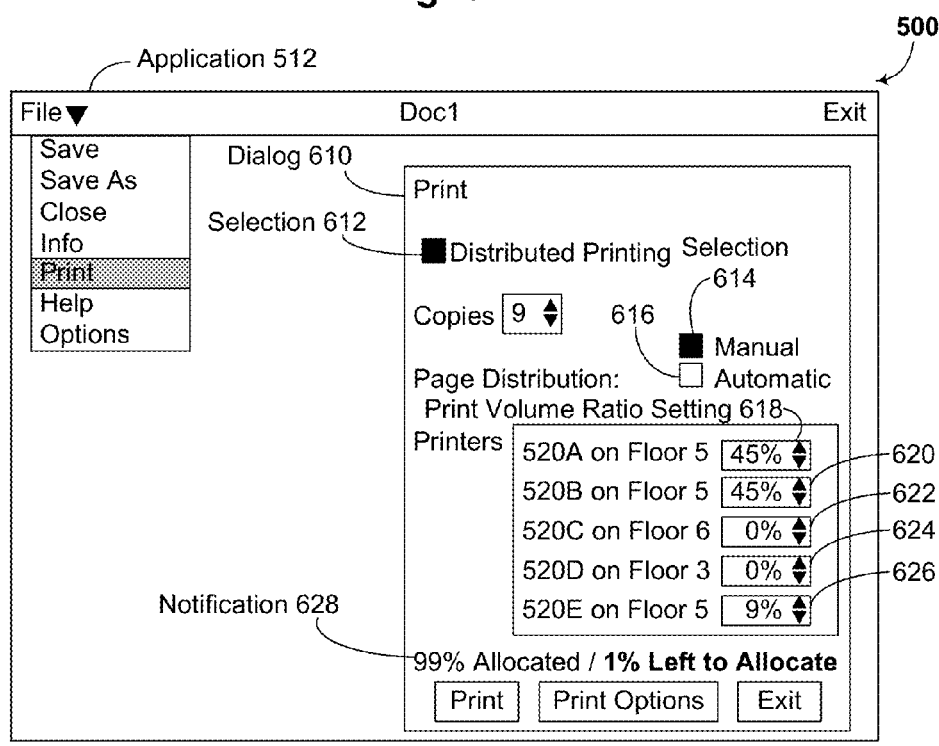
FIG. 6B shows a print dialog associated with an application in the scenario of FIG. 5 after a distributed printing selection has been made, according to an example embodiment.

FIG. 6B shows print dialog 610 associated with application 512 in scenario 500 after distributed printing selection 612 has been made, according to an example embodiment. In response to making distributed printing selection 612, a printer driver, application 512, and/or other software executing on client device 510 can update dialog 610, which is configured to display, choose, and/or modify at least page distribution selections 614 and 616, print volume ratio settings 618, 620, 622, 624, and 626, and notification 628.

Dialog 610 allows for allocation of a distributed print job to print devices on the basis of a print volume ratio, or percentage of the entire print job. This print volume ratio can be specified for each print device from 0 to 100. At one extreme, if a print volume ratio for a print device is set to 0, then the print device is not allocated a print job portion of the distributed print job. At another extreme, if a print volume ratio for a print device is set to 100, then the print device is assigned the entire distributed print job; i.e., the print device is assigned to single print the print job. Assigning print volume ratio values between 0 and 100 to a print device indicates that the print device is to print a print job portion of the distributed print job. A sum of the total value of the print volume ratios for all print devices should be 100, to indicate allocation of the entire distributed print job to print devices. In some embodiments, dialog 610 can be configured to not initiate printing of the distributed print job until the total value of the print volume ratios for all print devices is set to 100.

In scenario 500, the 9-copy distributed print job has 360 pages. As shown in FIG. 6B, dialog 610a is used to allocate 45% of the 9-copy distributed print job to each of print devices 520a and 520b via respective print volume ratio settings 618 and 620, to not allocate any portion; that is, 0%, of the 9-copy distributed print job to respective print devices 520c and 520d via respective print volume settings 622 and 624, and to allocate 9% of the 9-copy distributed print job to print device 520e via print volume ratio setting 626. Notification 628 displays information that 99% of the 9-copy distributed print job has been allocated to print devices, and 1% remains to be allocated.

Figure 6D:
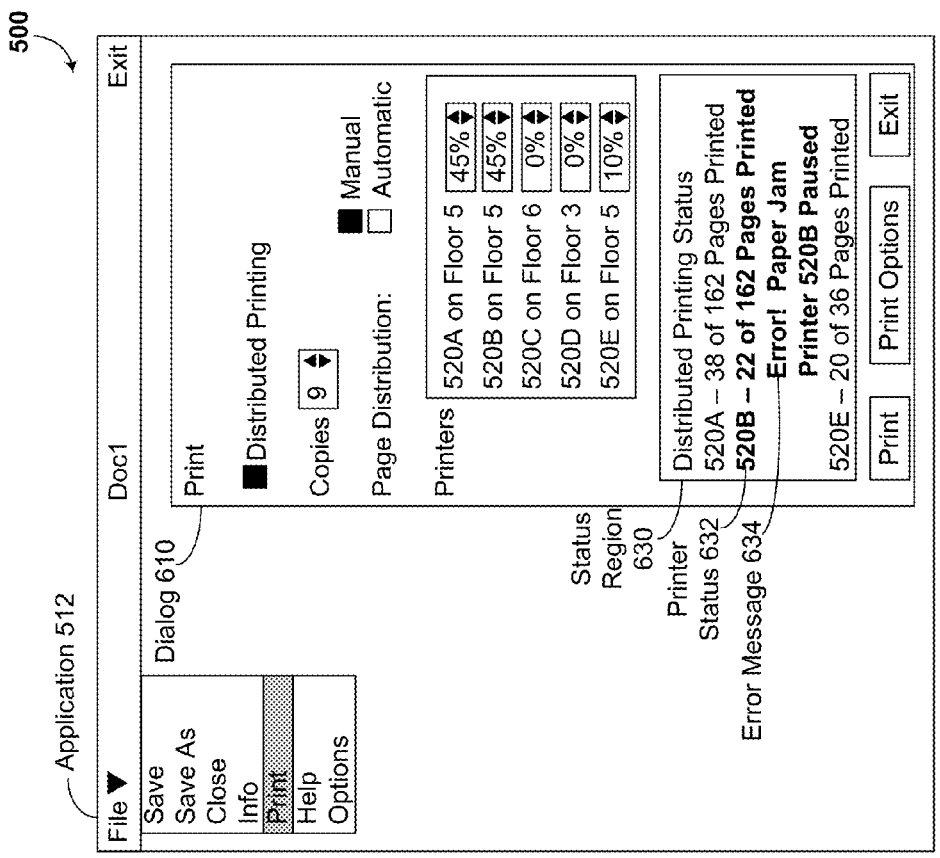
FIG. 6D shows a print dialog associated with an application in the scenario of FIG. 5 after a print device error interrupts printing of a print job portion, according to an example embodiment.
Figure 6C:
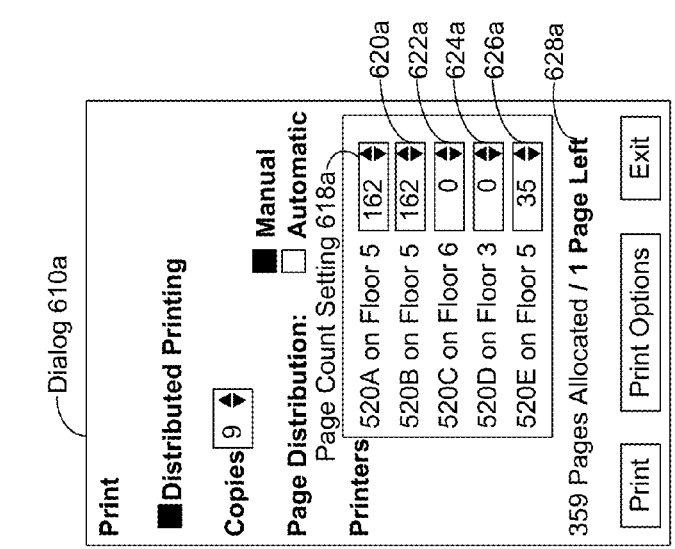
FIG. 6C shows another print dialog after a distributed printing selection has been made, according to an example embodiment.

FIG. 6C shows print dialog 610a after distributed printing selection 612 has been made, according to an example embodiment. Print dialog 610a is a variation of print dialog 610 enabling page count settings 618a, 618b, 618c, 618d, and 620a for respective print devices 520a, 520b, 520c, 520d, and 520e. Dialog 610a allows for allocation of a distributed print job to print devices on a per-page basis. In some embodiments, dialog 610a can be configured to not initiate printing of the 9-copy distributed print job until the total value of the enabling page count settings for all print devices equals a total number of pages for the distributed print job.

As shown in FIG. 6C, dialog 610a could be used to allocate 162 pages of the 9-copy distributed print job to each of print devices 520a and 520b via respective page count settings 618a and 620a, to not allocate any portion; that is, 0 pages of the 9-copy distributed print job to respective print devices 520c and 520d via respective page count settings 622a and 624a, and to allocate 35 pages of the 9-copy distributed print job to print device 520e via page count setting 626a. Notification 628a displays information that 359 pages of distributed print job have been allocated to print devices, and one page is remaining to be allocated.

Scenario 500 continues with dialog 610 specifying an initial split of the entire (100%) 9-copy distributed print job to three print devices: 45% to print device 520a, 45% to print device 520b, and 10% to print device 520e. Then, after splitting the entire 9-copy distributed print job (i.e., once the sum of print volume ratios is set to 100), dialog 610 can be used to initiate printing of the 9-copy distributed print job; e.g., by selection of the "Print" button at lower left of dialog 610.

Once instructed to initiate printing, client device 510 can use the techniques of either method 300 or method 400 to split the 9-copy distributed print job into print-job portions and provide print job portions to print devices 520a, 520b, and 520e for printing allocated percentages of the distributed print job. In scenario 500, print device 520a receives a print job portion of the first 45% (or 162 pages) of the 9-copy distributed print job, print device 520b receives a print job portion of the second 45% of the 9-copy distributed print job, and print device 520e receives a print job portion of the remaining 10% (or 36 pages) of the 9-copy distributed print job. After reception of their respective print job portions, print devices 520a, 520b, and 520e start printing their respective print job portions.

In scenario 500, the first 162 pages of the 9-copy distributed print job are assigned to print device 520a, which is the first print device assigned a print job portion via dialog 610, the second 162 pages of the 9-copy distributed print job are assigned to print device 520b, which is the second print device assigned a print job portion via dialog 610, and the last 36 pages of the 9-copy distributed print job are assigned to printed by print device 520e, which is the third or last print device assigned a print job portion via dialog 610. In other scenarios, dialog 610 and/or 610a can be configured to specify an assignment of an order of print job portions to print devices. For example, dialog 610 and/or 610a could be used to assign print job portions "1", "2", and "3" to respective print devices 520e, 520a, and 520b. In keeping with this example assignment, print device 520e could print the first 36 pages of the 9-copy distributed print job, print device 520a could print the next 162 pages of the 9-copy distributed print job, and print device 520b could print the last 162 pages of the 9-copy distributed print job. Other techniques for assigning print-job portions to print devices are possible as well.

FIG. 6D shows dialog 610 associated with application 512 in scenario 500 after an error of print device 520b interrupts printing of a print job portion, according to an example embodiment. In some embodiments, dialog 610 can be configured to provide notifications of one or more error conditions that arise during printing of distributed print jobs. Once an error condition arises on a print device, printing of the print job portion can be paused automatically. In response to the one or error conditions, the distributed print job can be resumed without change (e.g., in response to a paper low or other message that does not preclude the print device from continuing to print a print job portion), the distributed print job can be canceled, the print-job portion can be removed, paused, and/or reallocated from the print device with the error condition.

The client device and/or a print device can inform a user about one or more error conditions. For example, one or more messages related to an error condition can be shown on a display unit of a print device, such as an operation panel equipped with the printing device. The messages can also be displayed on the client device; e.g., as part of dialog 610 or as part of a printer status window/control panel. The message(s) related to error condition(s) can provide information about which print device is having one or more error conditions, information about one or more error conditions, and perhaps information about correcting the error condition(s).

A print job portion that is interrupted by one or more error conditions can be moved to one or more alternative print devices and/or can be restarted on the same print device once the error condition clears. For example, suppose 100 pages of a print job portion are assigned to print device PD1 and an error condition arises on print device PD1 after 40 pages are printed. Then, the error condition can be reported and suitable display message(s) generated for display on dialog 610 and/or on a printer status window/control panel as discussed above.

In some cases, the remaining 60 pages can be printed on an alternative print device. In other related cases, the print job portion can be paused while one or more error conditions on print device PD1 are cleared. Once the one or more error conditions are cleared, the print job portion can be restarted so that the remaining 60 pages can be printed on print device PD1. In even other related cases, multiple error conditions can arise; e.g., a print jam and lack of toner, and some but not all of the multiple errors could be cleared. In these cases where multiple error conditions are partially but not completely cleared, some or all of the remaining 60 pages can be printed on the alternative print device.

As another example, suppose 10 pages*50 copies=500 pages of a print job portion assigned to print device PD1 and an error condition arises after 19 complete copies are printed, then the remaining 31 copies/310 pages can be printed on the alternative printing device. If the $20^{th}$ copy was partially printed by print device PD1 before the error condition, the alternative printing device can start with printing, as a remaining print job portion, either the entire $20^{th}$ copy or can start with the page being printed by print device PD1 at the time of the error condition. Or, in related examples, the print-job portion can be paused while one or more error conditions are cleared on print device PD1, the error condition(s) can be completely cleared, the print job portion can be restarted so that the remaining 31 copies/310 pages can be printed on print device PD1. In cases where multiple error conditions are partially but not completely cleared, some or all of the remaining 31 copies can be printed on the alternative print device.

In response to error conditions, a print job portion can be further subdivided. For example, a port monitor and/or other software on client device 510 may split an interrupted print-job portion into smaller sub-portions based on a number of pages and/or a number of copies, to minimize reprinting when an error happens. For example, suppose a distributed print job of 100 copies is split into 4 print job portions of 25 copies and distributed to 4 print devices including print device PD2. Then, suppose PD2 develops an error condition after printing the $13^{th}$ copy of its print job portion. Then, the remaining 12 copies of PD2's print job portion can be further subdivided into 2 or more print job sub-portions—for example, PD2's remaining print job portion can be split into 3 print job sub-portions of four copies each. Then, each of the three print devices already working on the distributed print job can be further assigned one of the three print-job sub portions.

As another example, print device PD2's remaining print job portion can be split into two print job sub-portions: one sub-portion of six copies for an alternative print device to print, and three print job sub-portions of two copies to be assigned to each of the three print devices already working on the distributed print job. As still another example, print device PD2's remaining print job portion can be split into two (or more) print job sub-portions to be printed by two (or more) alternative print devices not already working on the distributed print job. Such recovery and/or print job subdivision procedures may be set before printing a distributed print job, for example in default settings about alternative print devices and/or subdividing print-job portions.

In scenario 500, during the printing of the 9-copy distributed print job using print devices 520a, 520b, and 520c, print device 520b developed a paper jam after printing 22 of 162 pages, as indicated by printer status 632 and the "Error! Paper Jam!" error message 634 for print device 520b in status region 630 of dialog 610. Status region 630 also indicates that the other two print devices printing the 9-copy distributed print job—print devices 520a and 520e—are in the process of successfully printing their portions: print device 520a has printed 38 out of its allocated 162 pages and print device 520e has printed 20 out of its allocated 36 pages.

Figure 6E:
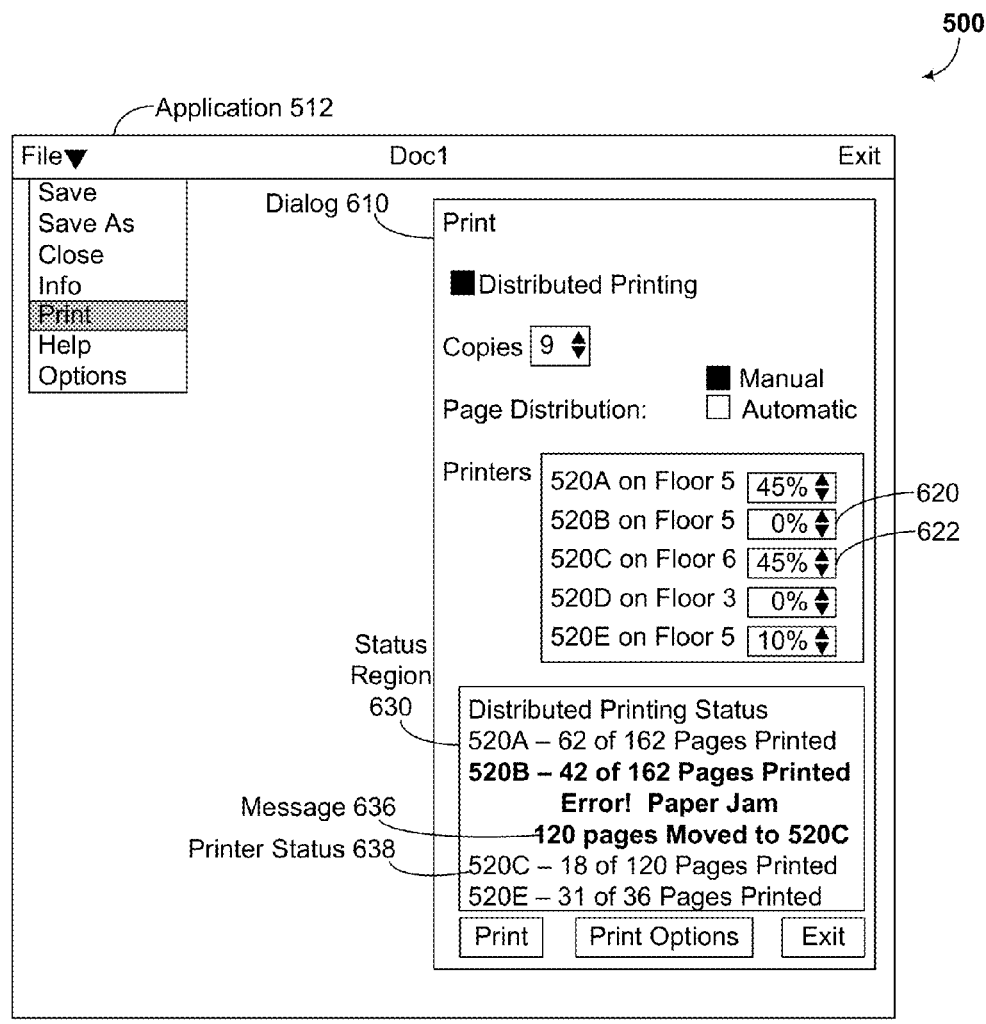
FIG. 6E shows a print dialog associated with an application in the scenario of FIG. 5 after reallocation of an interrupted print job portion, according to an example embodiment.

FIG. 6E shows a dialog 610 associated with application 512 in scenario 500 after reallocation of the interrupted print job portion initially allocated to print device 520b, according to an example embodiment. In scenario 500, after print device 520b develops a paper jam and a user of client device 510 is so informed by printer status region 630 of print dialog 610, the user can use dialog 610 to reallocate the print job portion interrupted by the print jam on print device 520 to another print device.

FIG. 6E shows print dialog 610 with print volume ratio setting 620 associated with print device 520b set to 0% and print volume ratio setting 622 associated with print device 520c set to 45%. By changing print volume ratio setting 620 from 45% as set earlier in scenario 500; e.g., as shown in FIGS. 6B and 6D, to 0% as shown in FIG. 6E, the user of dialog 610 has indicated that the print job portion allocated to print device 520b is no longer allocated to print device 520b. In some embodiments, dialog 610 allows deallocation of print job portions only from print devices that have error conditions, such as the paper jam condition of print device 520b.

By also changing print volume ratio setting 622 from 0% as set earlier in scenario 500; e.g., as shown in FIGS. 6B and 6D, to 45% as shown in FIG. 6E, the user of dialog 610 has indicated that the print job portion previously allocated to print device 520b is now allocated device 520c; e.g., print device 520c is an alternate print device used if or when print device 520b develops an error condition.

In some embodiments, dialog 610 allows allocation of print job portions to alternate print devices after a print device allocated to print a print job portion has developed an error condition, such as the allocation of a print-job portion to print device 520c after the paper jam condition of print device 520b. In other embodiments, dialog 610 and/or another user interface object is configured to allow specification of alternate print devices either before or during allocation of print job portions to print devices. In scenarios other than scenario 500, the error condition of print device 520b can be cleared; e.g., the paper unjammed from print device 520b, and print device 520b can continue on with printing the print-job portion.

In FIG. 6E, status region 630 includes message 636 that indicates that 120 unprinted pages of the print job portion allocated to print device 520b have been "Moved" or reallocated "to 520C"—in scenario 500 as shown in status region 630, 42 of the 162 pages of the print job portion initially-assigned to print device 520b have been printed, leaving 120 unprinted pages when print device 520b developed its paper jam. Status region 630 also includes printer status 638 to indicate that "18 of 120" pages of the print job portion assigned to print device 520c have been printed. Status region 630 also indicates that the other two print devices printing the distributed print job of scenario 500—print devices 520a and 520e—have continued to successfully print more of their allocated print job portions. In particular, status region 630 indicates that print device 520a has printed 62 of its allocated 162 pages and print device 520e has printed 31 of its allocated 36 pages.

Figure 6F:
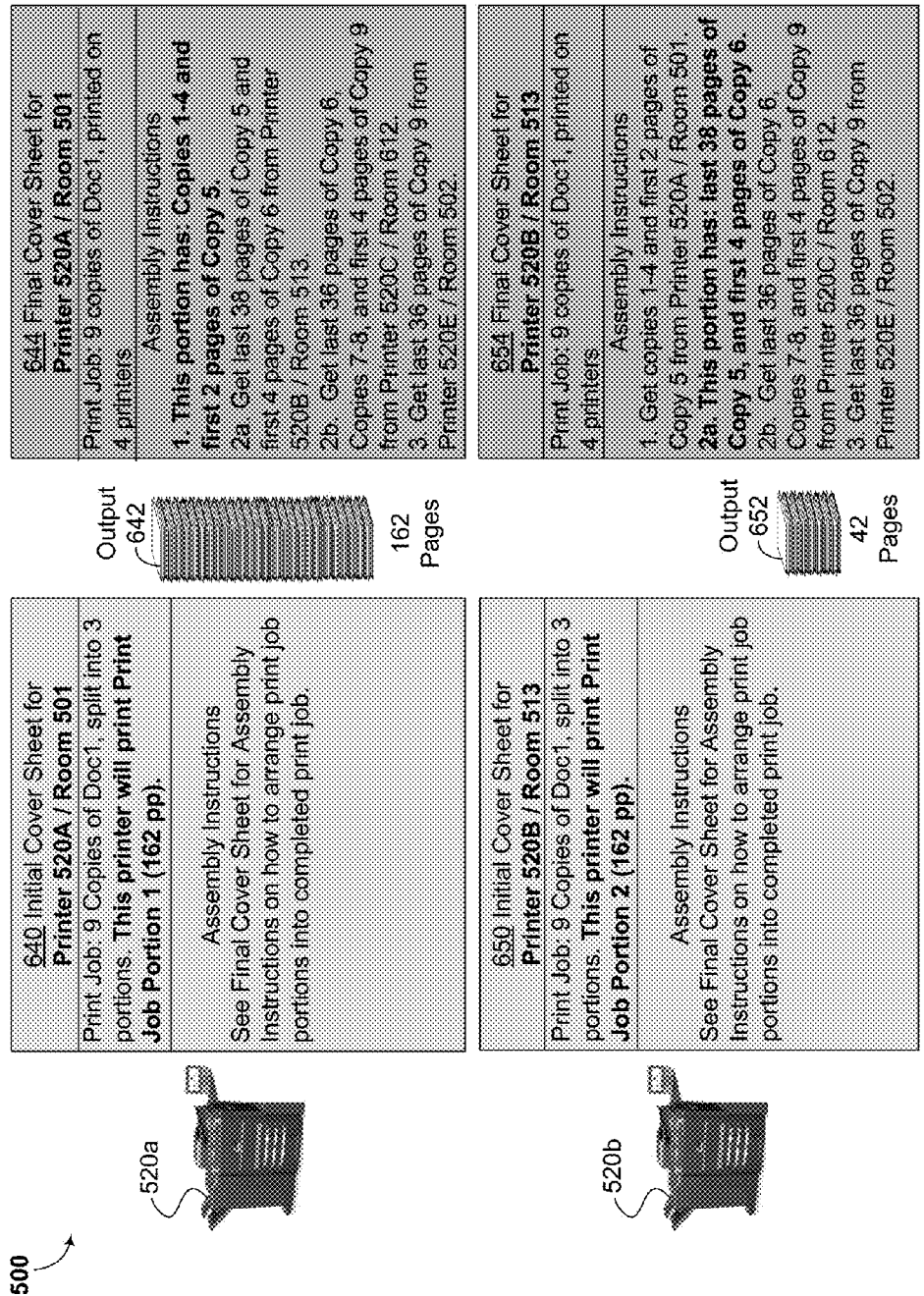

Scenario 500 continues with print devices 520a, 520c, and 520e each successfully printing their respective print job portions of the 9-copy distributed print job. FIGS. 6F and 6G each illustrate print device output for the 9-copy distributed print job of scenario 500, according to an example embodiment.

The client device can provide instructions that can be used to assist in assembling, or combining, output of print-job portions into output of a distributed print job. For example, each print job portion can have one or more instruction cover sheets. An instruction cover sheet can indicate print device status, error conditions (if necessary), print device location(s), and/or instructions on how to assemble the printed output of the separately-printed print job portions into the printed output of the distributed print job. In some embodiments, part or all of the information in an instruction cover sheet can be provided on a user interface of the client device; e.g., as part of dialog 610 or another dialog.

Paper instruction cover sheets can indicate physical start and end positions within printed output of a distributed print job. Paper instruction cover sheets can inform a user when other print jobs are printed before or after print job portions. For example, suppose a print device fails to complete a print job portion of a distributed portion job, and the remaining print-job portion is transferred to the alternative printer; e.g., such as occurred in scenario 500 with the paper jam of print device 520b and transferring of the print job portion to print device 520c. In this case, another print job may have been printed between these separate print job portions. Or even if no other print job is performed, separately printed print job portions may not be contiguous portions; for example, when print job portions are printed by more than two printers. In particular embodiments, paper instruction cover sheets can be printed in color paper to aid user visibility.

FIG. 6F shows that print device 520a printed 164 pages: initial cover sheet 640, output 642 representing the first 162 page print-job portion of the 9-copy distributed print job of scenario 500, and final cover sheet 644. In other scenarios, print device 520a can generate output 642 without printing initial cover sheet 640 and/or final cover sheet 644.

In scenario 500, print device 520a first printed initial cover sheet 640 at the onset of printing the print job portion, then printed output 642, and then printed final cover sheet 644. Both initial cover sheet 640 and final cover sheet 644 identify printer "520A" located in "Room 501" as printing the print job portion, indicate that the 9-copy distributed print job includes "9 copies of Doc1", and have "Assembly Instructions". Initial cover sheet 640 indicates information available at the onset of printing the distributed print job; e.g., the distributed print job was "split into 3 portions" and that print device 520a "will print Print Job Portion 1 (162 pp)", and has initial assembly instructions that refer to final cover sheet 644.

Final cover sheet 644 has information available after printing the 9-copy distributed print job, such as an indication that the 9-copy distributed print job was "printed on 4 printers into 3 portions". The assembly instructions of final cover sheet 644 indicate that: (1) "[t]his portion" printed on print device 520a "has Copies 1-4 and [the] first 2 pages of Copy 5" of the 9-copy distributed print job, (2) print device 520b located in "Room 513" has printed print job portion "2a" that includes the "last 38 pages of Copy 5 and [the] first 4 pages of Copy 6" of the 9-copy distributed print job, (3) print device 520c located in "Room 612" has printed print-job portion "2b" that includes the "last 36 pages of Copy 6, Copies 7-8, and [the] first 4 pages of Copy 9" of the 9-copy distributed print job, and (4) print device 520e located in "Room 502" has printed print job portion "2b" that includes the "last 36 pages of Copy 9" of the 9-copy distributed print job.

FIGS. 6F and 6G show that respective print devices 520b, 520c, and 520e respectively printed 44 pages, 122 pages, and 38 pages as part of scenario 500. Each of print devices 520b, 520c, and 520e printed an initial cover sheet, output for a print job portion of the 9-copy distributed print job of scenario 500, and a final cover sheet.

Each of the initial cover sheets printed by print devices 520a, 520b, 520c, and 520e for the 9-copy distributed print job are printed in a light grey color, and each of the final cover sheets printed by print devices 520a, 520b, 520c, and 520e for the 9-copy distributed print job are printed in a dark grey color. In many cases, print-job output is printed on white paper, and so cover sheets printed on colored paper allow for ready cover sheet identification. In other scenarios, initial and/or final cover sheets can be printed on other colors of paper than grey.

FIG. 6F shows that print device 520b printed initial cover sheet 650, output 652 representing a 42 page sub-portion of the second 162 page print job portion of the 9-copy distributed print job of scenario 500, and final cover sheet 654. FIG. 6G shows that print device 520c printed initial cover sheet 660, output 662 representing a 120 page sub-portion of the second 162 page print job portion of the 9-copy distributed print job of scenario 500, and final cover sheet 664. FIG. 6G also shows that print device 520e printed initial cover sheet 670, output 672 representing a third 36 page print job portion of the 9-copy distributed print job of scenario 500, and final cover sheet 674. In other scenarios, some or all of respective print devices 520b 520c, 520e can respectively generate outputs 652, 662, 672 without printing respective initial cover sheets 650, 660, 670 and/or respective final cover sheets 654, 664, 674.

In scenario 500, respective print devices 520b and 520e first printed respective initial cover sheets 650, 670 at the onset of printing their respective print job portions, then printed respective outputs 652, 670 and then printed respective final cover sheets 654, 674. Scenario 500 also includes print device 520c printing initial cover sheet 660 upon taking over as an alternative print device for print device 520b, printing output 662, and then printing final cover sheet 664.

Both initial cover sheet 650 and final cover sheet 654 of FIG. 6F identify printer "520B" located in "Room 513" as printing a print-job portion, indicate that the 9-copy distributed print job includes "9 copies of Doc1", and have "Assembly Instructions". Initial cover sheet 650 indicates information available at the onset of printing the 9-copy distributed print job such as discussed above in the context of initial cover sheet 640. Final cover sheet 654 has information available after printing the 9-copy distributed print job, including assembly instructions similar to the assembly instructions of final cover sheet 644 discussed above, except that the assembly instructions of final cover sheet 654 indicate that "copies 1-4 and [the] first 2 pages of Copy 5" can be obtained from "Printer 520A" in "Room 501" and that "this portion" printed by print device 520a includes the "last 38 pages of Copy 5, and [the] first 4 pages of Copy 6."

Also, both initial cover sheet 660 and final cover sheet 664 of FIG. 6G identify printer "520C" located in "Room 612" as printing a print job portion, indicate that the 9-copy distributed print job includes "9 copies of Doc1", and have "Assembly Instructions". Initial cover sheet 660 has information available when print device 520c took on printing of the 9-copy distributed print job—this information includes an indication that print device 520c printed "a partial print job portion" that "was started by Printer 520B/Room 513, which printed 40 pages as Portion 2a" and that print device 520c"will complete the print job portion as Portion 2b", as well as assembly instructions discussed above in the context of initial cover sheet 640.

FIG. 6G shows that final cover sheet 664 indicates information available after printing the 9-copy distributed print job, including assembly instructions similar to the assembly instructions of final cover sheet 644 discussed above, except that the assembly instructions of final cover sheet 664 indicate that "copies 1-4 and [the] first 2 pages of Copy 5" can be obtained from "Printer 520A" in "Room 501" and that "this portion" or portion "2b" printed by print device 520c includes the "last 36 pages of Copy 6, Copies 7-8, and [the] first 4 pages of Copy 9."

Further, both initial cover sheet 670 and final cover sheet 674 of FIG. 6G identify printer "520E" located in "Room 502" as printing a print job portion, indicate that the 9-copy distributed print job includes "9 copies of Doc1", and have "Assembly Instructions". Initial cover sheet 670 has information available at the onset of printing the 9-copy distributed print job, such as discussed above in the context of initial cover sheet 640. Final cover sheet 674 indicates information available after printing the 9-copy distributed print job, including assembly instructions similar to the assembly instructions of final cover sheet 644 discussed above, except that the assembly instructions of final cover sheet 674 indicate that "copies 1-4 and [the] first 2 pages of Copy 5" can be obtained from "Printer 520A" in "Room 501" and that "this portion" or portion "3" printed by print device 520e includes the "last 36 pages of Copy 9."

Scenario 500 continues with another "12-copy" distributed print job being submitted; in this case, the print job includes printing twelve copies of the 40 page document entitled "Doc1", for a total print job size of 480 pages.

Figure 7A:
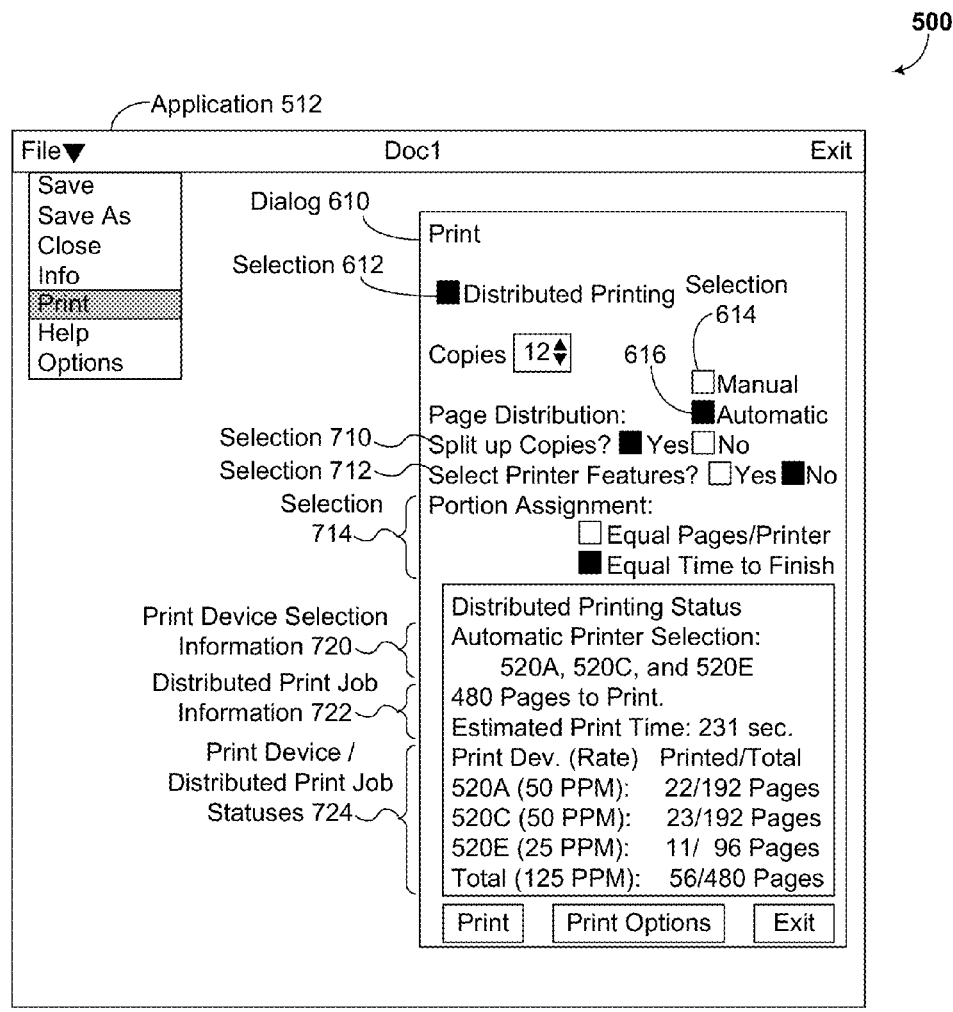
FIG. 7A shows a print dialog associated with an application in the scenario of FIG. 5, according to an example embodiment.

FIG. 7A shows print dialog 610 associated with application 512 in scenario 500, according to an example embodiment. Dialog 610 includes selection 612 for distributed printing —the user of client device 510 can make selection 612 to use distributed printing to print the requested twelve copies of the 40 page document Doc1. In response to making distributed printing selection 612, a printer driver, application 512, and/or other software executing on client device 510 can update dialog 610 which is configured to display, choose, and/or modify at least selections 614, 616, 710, 712, 714, print device selection information 720, distributed job information 722, and print device/distributed print job statuses 734.

In contrast to dialog 610 shown in FIG. 6A, where selection 614 for manual page distribution was made, FIG. 7A shows that selection 616 for automatic page distribution was made. After making selection 616, dialog 610 can be updated to display selections 710, 712, and 714 related to automatic page distribution.

Selection 710 can instruct client device 510 whether or not to split copies as part of splitting the distributed print job into print job portions. If "Yes" is chosen for selection 710, as shown in FIG. 7A, then client device 510 can split the distributed print job on per-copy boundaries; that is, each print job portion will have a whole number of copies of "Doc1" to print. If "NO" is chosen for selection 710 then client device 510 can split the distributed print job on per-page boundaries; that is, each print job portion may or may not have a whole number of copies of "Doc1" to print.

Selection 712 can instruct client device 510 whether or not to allow a user of client device 510 to choose printer features as part of splitting the distributed print job into print-job portions. If "Yes" is chosen for selection 712, then client device 510 can indicate common features for all candidate print devices and allow selection of uncommon features that, if selected, can reduce the number of candidate print device. If "NO" is chosen for selection 712, as shown in FIG. 7A, then client device 510 can select any candidate print device, regardless of print-device-specific features, for printing print job portion(s) of the distributed print job.

Selection 714 can instruct client device 510 to assign print job portions based on one of at last two criteria. If the "Equal Pages/Printer" criterion is chosen for selection 714, then client device 510 can divide the distributed print job into equal page-sized print-job portions for each print device selected for printing the distributed print job, while maintaining a "do not split-up copies" choice made using selection 710. For example, if four print devices were selected to print the distributed print job of twelve copies/480 pages, each selected print device would be assigned a print job portion having three copies/120 pages.

In another scenario, suppose a distributed print job to print seven copies of a 60 page document is to be divided into equal page-size portions among three print devices. If the "do not split-up copies" choice is made using selection 710, then either the equal page-size portion criterion or the do not split-up copies selection can be relaxed. If the equal page-size criterion is relaxed, then, for example, two selected print devices can print 2 copies and a third print device can print 3 copies. If the "do not split-up copies" choice is relaxed, then, each print device can be assigned a print job portion of 140 pages, which is ⅓ of the pages of the distributed print job. If neither the equal page-size criterion nor the "do not split-up copies" choice can be relaxed, then client device 510 can select additional print devices, if available; e.g., select seven print devices and assign one copy to each selected print device. In some cases, single printing can be used if selections made/criteria for automatic page distribution cannot be relaxed and yet there is no configuration of a plurality of print devices can satisfy all non-relaxable selections/criteria. Client device 510 can choose which conditions can be relaxed based on hard-coded software decisions, user selection and/or stored data; e.g., always decide that do not split-up copies is more important than equal page-size or vice versa, based on input received via dialog 610 and/or other user interface aspects of client device 510, and/or based on data regarding default printing decisions stored on client device 510.

If the "Equal Time to Finish" criterion is chosen for selection 714, as shown in FIG. 7A, then client device 510 can divide the distributed print job into print job portions that should take approximately the same amount of time print by each print device selected for printing the distributed print job, while maintaining a "do not split-up copies" choice made using selection 710. For example, suppose a distributed print job to print seven copies of a 60 page document is to be divided to be printed by three equally fast print devices. Then, according to Equation (1) above, the distributed print job should be divided into three equal page-sized portions. However, if the "do not split copies" choice is made via selection 710, then client device 510 can decide which conditions/criteria can be relaxed based on hard-coded software decisions, user selection and/or stored data such as discussed above in regarding the equal pages/printer choice of selection 714.

Scenario 700 continues with dialog 610 specifying automatic page distribution of the 12-copy distributed print job on a per-copy basis via selection 710, without considering print device features via selection 712, and based on an equal time to finish criteria. Then, dialog 610 can be used to initiate printing of the 12-copy distributed print job; e.g., by selection of the "Print" button at lower left of dialog 610.

Upon initiating printing of the 12-copy distributed print job, a user of client device 510 was prompted to choose whether the "do not split-up copies" selection or the "equal time to finish" criterion could be relaxed. In scenario 500, the user indicated that the "do not split-up copies" selection could be relaxed. Then, client device 520 selected the three fastest and in-service print devices from the system shown in FIG. 5 to print the 12-copy distributed print job—print devices 520a, 520c, and 520e as shown as part of print device selection information 720 of dialog 610. Print device 520b was not selected as that print device still had a print jam as discussed above in the context of the 9-copy distributed print job of scenario 500.

As shown in FIG. 5 and in dialog 610 of FIG. 7A, print device 520a can print at 50 PPM, print device 520c can print at 50 PPM, and print device 520e can print at 25 PPM. Client device 510 can calculate that the 12-copy distributed print job has 12*40=480 total pages to print. Client device 510 can then use techniques of either method 300 or method 400 to split the 12-copy distributed print job into three print job portions: a first 192-page print job portion for print device 520a, a second 192-page print job portion for print device 520c, and a third 96-page print job portion for print device 520e. In other scenarios, dialog 610 can be configured to specify an assignment of an order of print job portions to print devices, such as discussed above in the context of FIG. 6C.

Client device 510 can also can determine that each of print devices 520a and 520c will take about 192 pages/50 PPM=3.84 minutes or 230.4 seconds to print its respective print-job portion, and that print device 520e will take about 96 pages/25 PPM=3.84 minutes or 230.4 seconds to print its respective print job portion, and so determine an estimated print time of 231 seconds to print the 12-copy distributed print job. Client device 510 can cause dialog 610 to display the total page count and estimated print time determinations as distributed print job information 722.

Scenario 500 continues with client device 510 using techniques of either method 300 or method 400 to provide the three print-job portions of the 12-copy distributed print job to print devices 520a, 520c, and 520e. After reception of their respective print-job portions, print devices 520a, 520c, and 520e start printing their respective print job portions. FIG. 7A shows print device/distributed print job statuses 724 while the 12-copy distributed print job is in the process of being printed. Print device/distributed print job statuses 724 indicates that: print device 520a prints at a rate of 50 PPM and has printed 22 of 192 total pages of its print job portion, print device 520c prints at a rate of 50 PPM and has printed 23 of 192 total pages of its print job portion, print device 520e prints at a rate of 25 PPM and has printed 11 of 96 total pages of its print job portion, and that a total of 56 out of 480 pages in the 12-copy distributed print job have been printed.

Figure 7B:
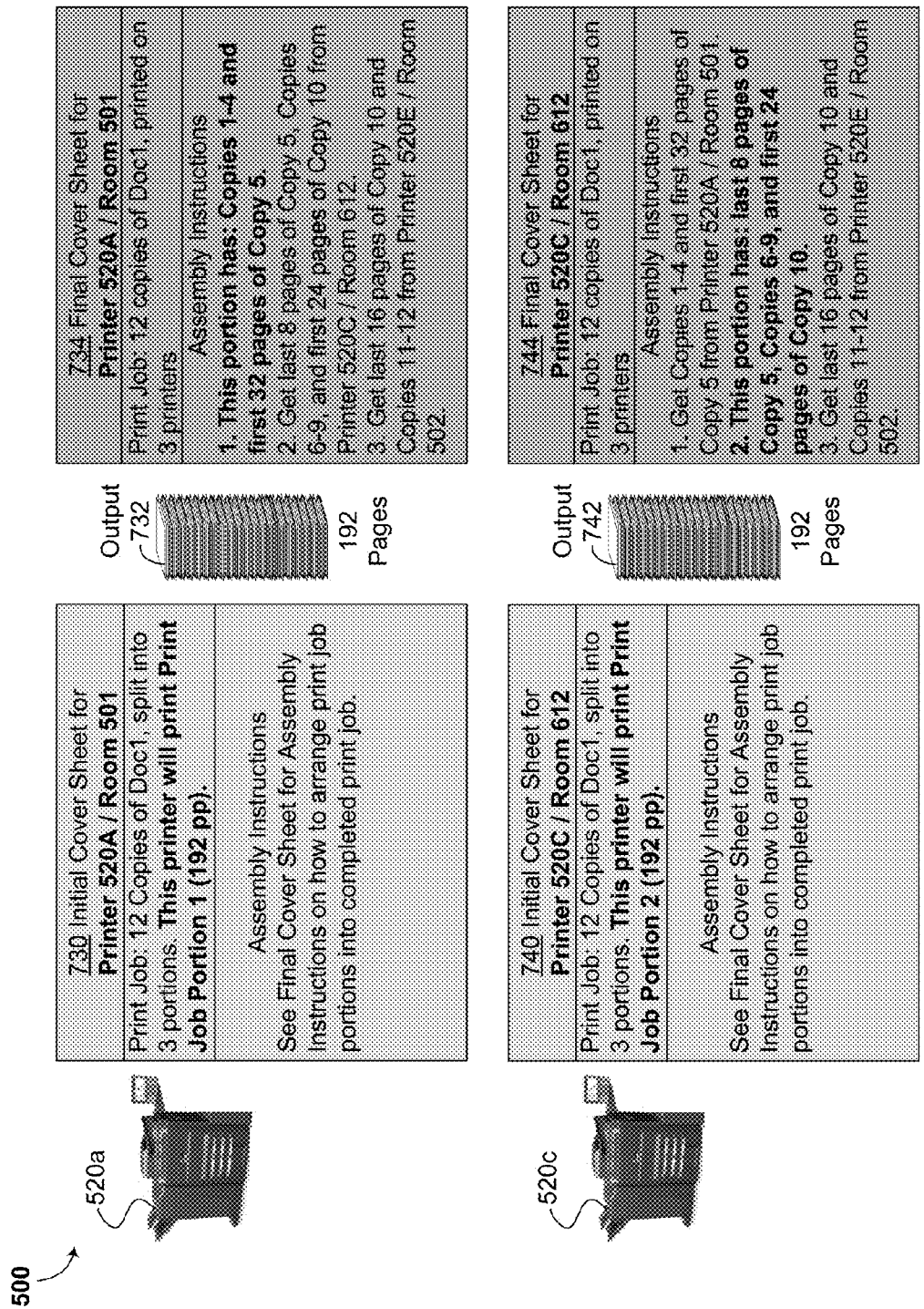
FIG. 7B illustrates print device output in the scenario of FIG. 5, according to an example embodiment.
Figure 7C:
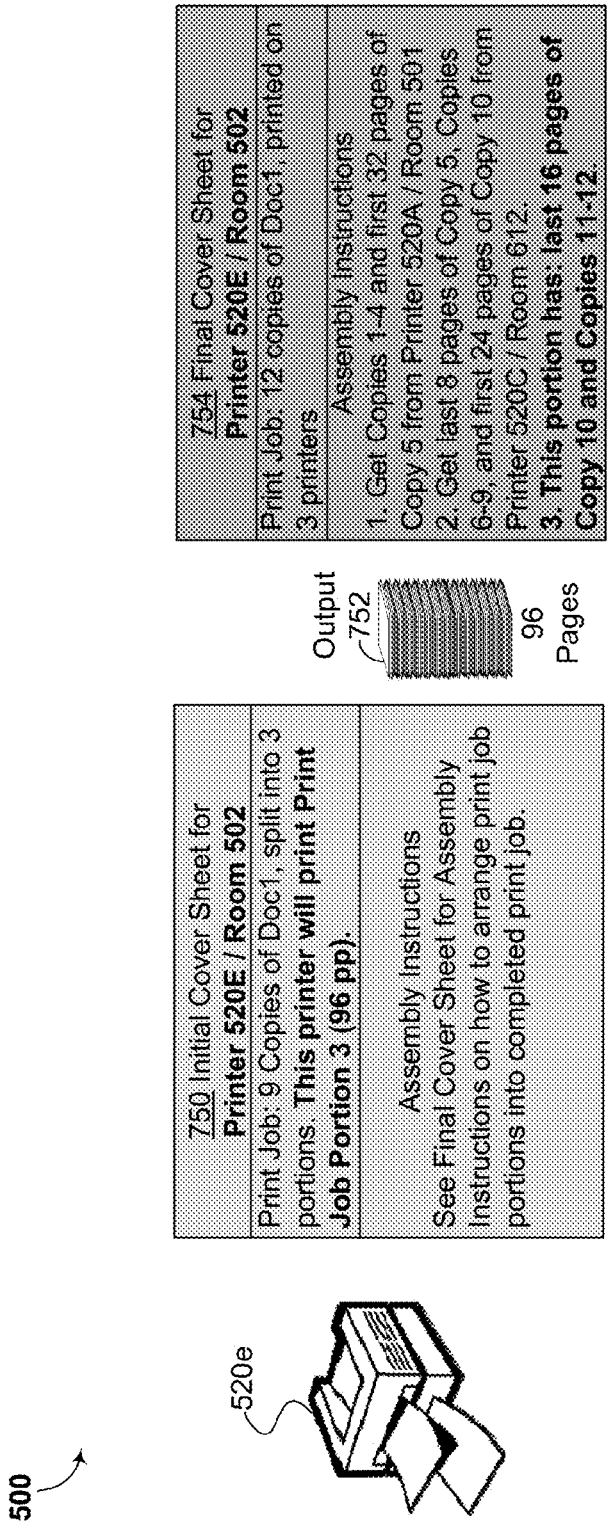
FIG. 7C illustrates print device output in the scenario of FIG. 5, according to an example embodiment.

Scenario 500 continues with print devices 520a, 520c, and 520e each successfully printing their respective print job portions of the 12-copy distributed print job. FIGS. 7B and 7C each illustrate print device output for the 12-copy distributed print job of scenario 500, according to an example embodiment.

FIG. 7B shows that print device 520a printed 194 pages: initial cover sheet 730, output 732 representing the first 192 page print job portion of the 12-copy distributed print job of scenario 500, and final cover sheet 734. In other scenarios, print device 520a can generate output 732 without printing initial cover sheet 730 and/or final cover sheet 734.

In scenario 500, print device 520a first printed initial cover sheet 730 at the onset of printing the print job portion, then printed output 732, and then printed final cover sheet 734. Both initial cover sheet 730 and final cover sheet 734 identify printer "520A" located in "Room 501" as printing the print job portion, indicate that the 12-copy distributed print job includes "12 copies of Doc1", and have "Assembly Instructions". Initial cover sheet 730 has information available at the onset of printing the 12-copy distributed print job; e.g., the distributed print job was "split into 3 portions", print device 520a "will print Print Job Portion 1 (192 pp)", and has initial assembly instructions that refer to final cover sheet 734.

Final cover sheet 734 has information available after printing the 12-copy distributed print job, such as an indication that the 12-copy distributed print job was "printed on 3 printers". The assembly instructions of final cover sheet 734 indicate that: (1) "[t]his portion" printed on print device 520a "has Copies 1-4 and [the] first 32 pages of Copy 5" of the 12-copy distributed print job, (2) print device 520c located in "Room 612" has printed print job portion "2" that includes the "last 8 pages of Copy 5, Copies 6-9, and [the] first 24 pages of Copy 10" of the 12-copy distributed print job, and (3) print device 520e located in "Room 502" has printed print-job portion "3" that includes the "last 16 pages of Copy 10 and Copies 11-12" of the 12-copy distributed print job.

FIGS. 7B and 7C show that respective print devices 520c and 520e respectively printed 194 pages and 98 pages as part of scenario 500. Each of print devices 520c and 520e printed an initial cover sheet, output for a print job portion of the 12-copy distributed print job of scenario 500, and a final cover sheet.

Each of the initial cover sheets printed by print devices 520a, 520c, and 520e for the 12-copy distributed print job is printed in a light grey color, and each of the final cover sheets printed by print devices 520a, 520c, and 520e for the 12-copy distributed print job is printed in a dark grey color. In many cases, print job output is printed on white paper, and so cover sheets printed on colored paper allow for ready cover sheet identification. In other scenarios, initial and/or final cover sheets can be printed on other colors of paper than grey.

Both initial cover sheet 740 and final cover sheet 744 of FIG. 7B identify printer "520C" located in "Room 612" as printing a print job portion, indicate that the 12-copy distributed print job includes "12 copies of Doc1", and have "Assembly Instructions". Initial cover sheet 740 has information available at the onset of printing the 12-copy distributed print job; e.g., the distributed print job was "split into 3 portions", print device 520c "will print Print Job Portion 2 (192 pp)", and has initial assembly instructions that refer to final cover sheet 744.

FIG. 7B shows that final cover sheet 744 indicates information available after printing the 12-copy distributed print job, including assembly instructions similar to the assembly instructions of final cover sheet 734 discussed above, except that the assembly instructions of final cover sheet 744 indicate that "Copies 1-4 and [the] first 32 pages of Copy 5" can be obtained from "Printer 520A" in "Room 501" and that "this portion" or portion "2" printed by print device 520c includes the "last 8 pages of Copy 5, Copies 6-9, and [the] first 24 pages of Copy 10" of the 12-copy distributed print job.

Further, both initial cover sheet 750 and final cover sheet 754 of FIG. 7C identify printer "520E" located in "Room 502" as printing a print job portion, indicate that the 12-copy distributed print job includes "12 copies of Doc1", and have "Assembly Instructions". Initial cover sheet 750 has information available at the onset of printing the 12-copy distributed print job, such as discussed above in the context of initial cover sheet 730. Final cover sheet 754 indicates information available after printing the 12-copy distributed print job, including assembly instructions similar to the assembly instructions of final cover sheet 734 discussed above, except that the assembly instructions of final cover sheet 754 indicate that "Copies 1-4 and [the] first 32 pages of Copy 5" can be obtained from "Printer 520A" in "Room 501" and that "this portion" or portion "3" printed by print device 520e includes the "last 16 pages of Copy 10 and Copies 11-12" of the 12-copy distributed print job.

Figure 8A:
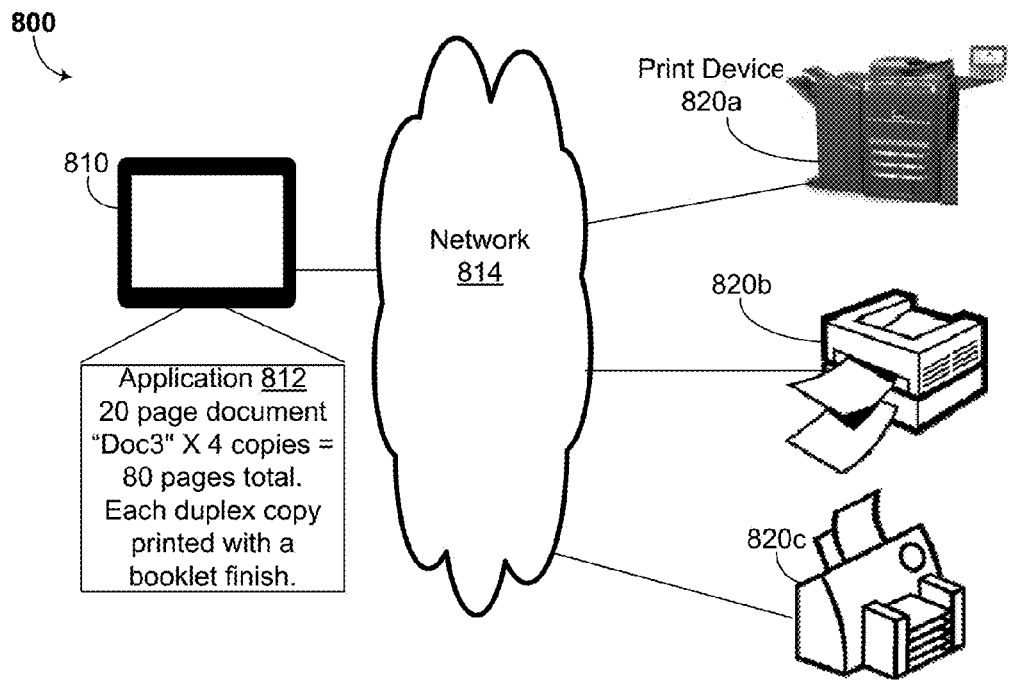
FIG. 8A illustrates a system used in a scenario for printing output accompanied by a print device feature table, according to an example embodiment.

FIG. 8A illustrates a system used in scenario 800 for printing output accompanied by print device feature table 830, according to an example embodiment. Scenario 800 involves a system including client device 810 and print devices 820a, 820b, and 820c all interconnected via network 814. In scenario 800, client device 810 is executing software application 812 to work with a 20-page document entitled "Doc3", which is printed once during the scenario. More specifically, in scenario 800, a user of client device 810 would like to print four copies of document Doc3 as a distributed print job, where each of the four copies is duplex printed and has a booklet finish.

In scenario 800 each print device 820a, 820b, 820c has different features. The specific features of respective print devices 820a, 820b, and 820c are summarized in respective Tables 2A, 2B, and 2C below:

TABLE 2A

| Feature Type | Print Device 820a Specific Features |
| --- | --- |
| Color Mode | Mono, Color |
| Layout features | NUp, Poster, Scaling, Booklet, Duplex, Full Bleed |
| Paper size support | A4, Letter, Ledger, Legal, A3, B5 |
| Finishing | Staple, Punch |
| PDL | PCLXL, PCL5, KPDL, PDF |

TABLE 2B

| Feature Type | Print Device 820b Specific Features |
| --- | --- |
| Color Mode | Mono |
| Layout features | NUp, Poster, Scaling, Booklet, Duplex |
| Paper size support | A4, Letter, Ledger, Legal, B5 |
| Finishing | None |
| PDL | PCLXL, PCL5, KPDL |

TABLE 2C

| Feature Type | Print Device 820c Specific Features |
| --- | --- |
| Color Mode | Mono, Color |
| Layout features | NUp, Poster, Scaling, Full Bleed |
| Paper size support | A4, Letter, Ledger, Legal, A3 |
| Finishing | None |
| PDL | PCLXL, PCL5, KPDL, PDF |

The term "PDL" of Tables 2A-2C is an acronym for Page Description Language, which is a relatively high-level language for describing a layout of a printed page. Many print devices support one or more page description languages. Example page description languages include, but are not limited to, Printer Control Language XL (PCL XL), Printer Control Language 5 (PCL5), Kyocera Printer Control Language (KPCL), and Portable Document Format (PDF).

The features that are common to all three print devices in scenario 800 are shown in a normal font in Tables 2A-2C, such as the "Mono" color mode feature common to print devices 820a, 820b, 820c, while features that are not common to all three print devices in scenario 800 are shown in a bold and italic font in Tables 2A-2C, such as the "Color" color mode feature of print device 820a as indicated in Table 2A and of print device 820c as indicated in Table 2C.

The data of Tables 2A-2C is summarized in print device feature table 830 of FIG. 8A. Print device feature table 830 has six columns—from left to right, these columns are: a feature type column indicating feature types indicated in Tables 2A-2C above, a feature column indicating specific features indicated in Tables 2A-2C above, and four columns for indicating features for print device 820a, print device 820b, print device 820c, and "common features" or features present on all three print devices of scenario 800.

In print device feature table 830, an "x" in a table cell is used to indicate the presence of a feature, and a blank table cell is used to indicate the absence of a feature. For example, the first non-heading row of print device feature table 830 relates to a "Color" feature of a "Color" feature type, with print devices 820a and 820c having the feature and print device 820b not having the feature, and so the feature is not a common feature. As another example, the second non-heading row of print device feature table 830 relates to a "Mono" feature of a "Color" feature type, with print devices 820a, 820b, 820c having the feature, and so the feature is a common feature.

In a distributed print job, a user may want to ensure that all print job portions are printed using one or more desired print device options; e.g., use color printing, A4 paper, stapled copies. If a candidate print device does not have all of the desired print device options, then the candidate print device may not be selected to print a print job portion of a distributed print job. In the event a desired print device option is not available, the distributed print job can be canceled, single printing can be used, or the user may choose other print devices to continue printing.

In some embodiments, a printer driver and/or other software of client device 810 can compare printing capabilities of all selected target printing devices and extract the common settings that are available on all candidate printing devices. Then, a user interface for the printer driver; e.g., dialog 610 discussed above in the context of scenario 500 and discussed below in the context of this scenario 800 can display the common features to inform a user what features are available on all candidate print devices. In particular embodiments, print devices having error conditions are excluded from being candidate print devices, and features of print devices having error conditions can be excluded when determining common features.

In other embodiments, the user interface enables selection of printer features related to print resolution and/or image quality. If a print device does not support a desired print resolution and/or image quality, then the print device can be excluded from selection as a candidate print device, even if the print device supports all other print device features required to print a print job portion of a distributed print job.

Figure 8B:
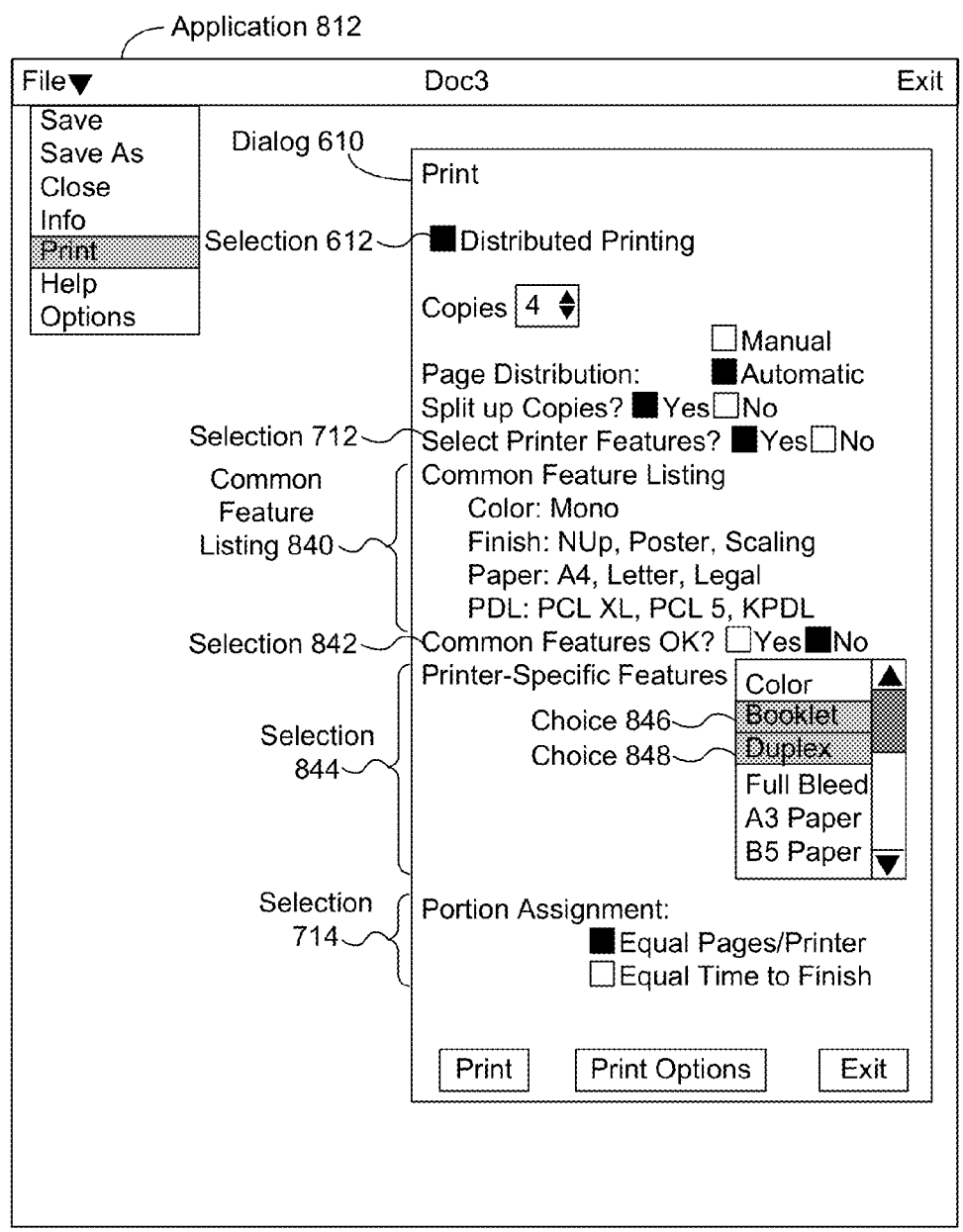
FIG. 8B shows a print dialog associated with an application in the scenario of FIG. 8A, according to an example embodiment.

FIG. 8B shows print dialog 610 associated with application 812 in scenario 800, after distributed printing selection 612 has been made, according to an example embodiment. In response to making distributed printing selection 612, a printer driver, application 812, and/or other software executing on client device 810 can update dialog 610, which is configured to display, choose, and/or modify at least page distribution selections, split-up copies selection, and selection 712 related to selecting printer features.

In scenario 800, selections are made that are related to automatic page distribution, allowing splitting of copies while dividing the distributed print job into print job portions, and selection 714 for assigning equal pages to printers—these selections were discussed above in more detail in the context of scenario 500.

FIG. 8B shows that selection 712 to select printer features has been made using dialog 610. In response to making selection 712 related to selecting printer features, client device 810 can update dialog 610 to display common feature listing 840 and selection 842. Common feature listing 840 can show the print device features common to all three possible candidate print devices shown in the system of FIG. 8A and as listed as common features in print device feature table 830. As shown in FIG. 8B, common feature listing 840 includes a "Mono" color-type print device feature, "NUp", "Poster", and "Scaling" finish-type print device features, "A4", "Letter", and "Legal" paper-type print device features, and "PCL XL", "PCL 5", and "KPDL" PDL-type print device features.

Selection 842 can allow a user to decide whether using common features for printing a distributed print job are either "OK" (acceptable) or not. If selection 842 is set to "Yes", then using the common features, such as shown in common feature listing 840, for printing a distributed print job is acceptable. In scenario 800, though, the print job involves printing four copies of document Doc3 using duplex printing and with a booklet finish. Common feature listing 840 does not list duplex and booklet features as common features, so selection 842 is set to "No" to indicate that using the common features for printing a distributed print job is not acceptable.

In response to setting selection 842 to "No", client device 810 can update dialog 610 to display selection 844 of printer-specific print features. A printer-specific print feature is a print feature that is present on one or more but not all candidate print devices—in the case of scenario 800, a printer-specific print feature is a print feature that is present on one or more but not all of print devices 820a, 820b, and 820c. As shown in Tables 2A-2C above, print device feature table 830 of FIG. 8A, and selection 844 of FIG. 8B, example printer-specific print features for scenario 800 include color, booklet, duplex, full-bleed, A3 paper, and B5 paper print features as well as others not shown as part of selection 844. In scenario 800, a user of client device 800 uses selection 844 to make choice 846 to select use of a booklet printer-specific feature and to make choice 848 to select use of a duplex printer-specific feature. In other scenarios, more, fewer, and/or different printer-specific features can be selected for a distributed print job.

After receiving information about choices 846 and 848, client device 810 can determine that two print devices—print devices 820a and 820b—have both booklet and duplex print features. In scenario 800, both print devices 820a and 820b are available to print a print job portion of the distributed print job; i.e., no error conditions are present for either print device 820a or 820b. Then, scenario 800 continues with selection of print devices 820a and 820b to each receive a print job portion, where the print job portions of the distributed print job have an equal number of pages, as indicated by selection 714 shown in FIG. 8B. Dialog 610 can be used to initiate printing of the distributed print job; e.g., by selection of the "Print" button at lower left of dialog 610.

Once instructed to initiate printing, client device 810 can use the techniques of either method 300 or method 400 to split the distributed print job of scenario 800 into two equal page-sized print job portions and provide print job portions to print devices 820a and 820b. After reception of their respective print job portions, print devices 820a and 820b start printing their respective print job portions.

Figure 8C:
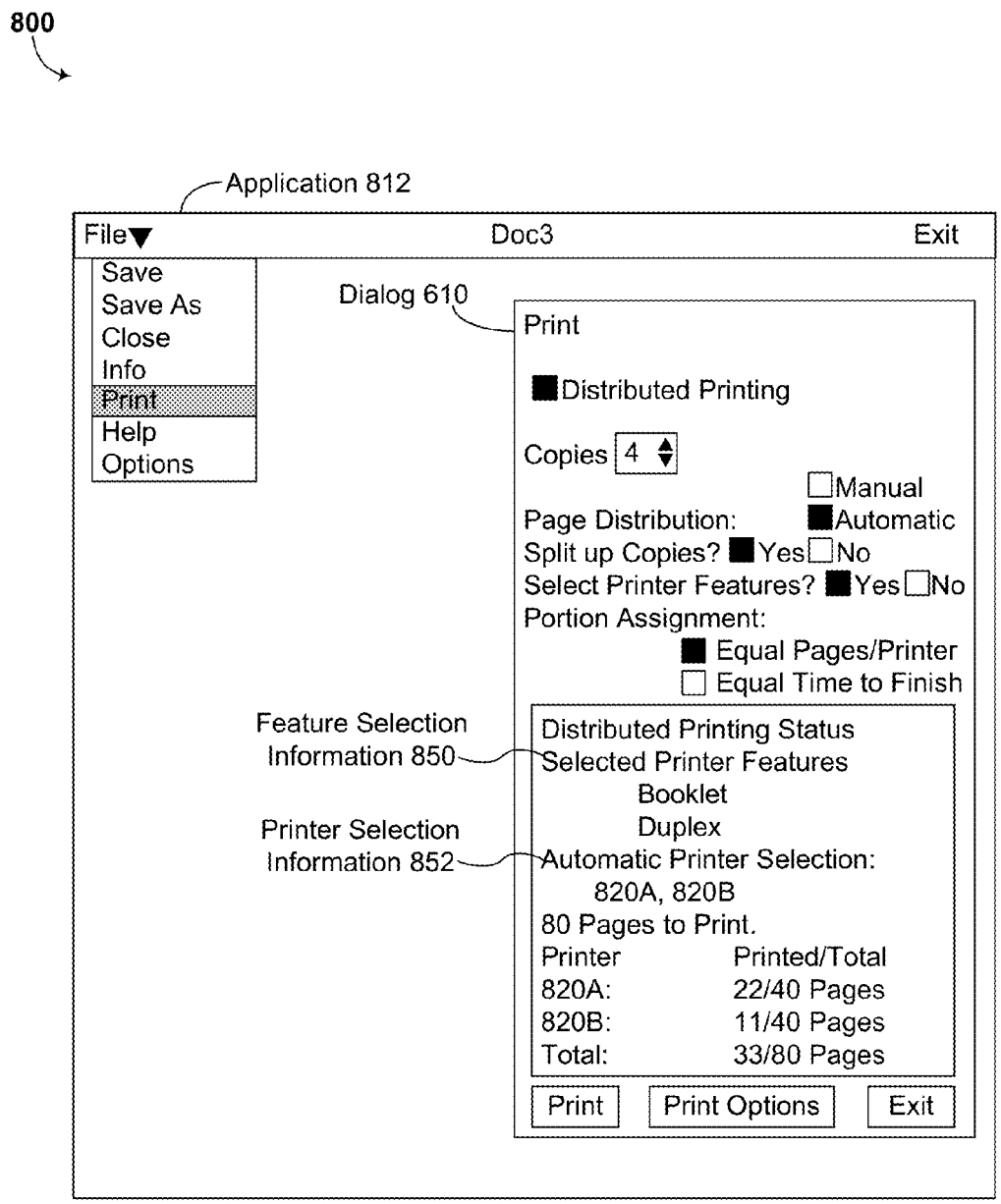
FIG. 8C shows a print dialog associated with an application in the scenario of FIG. 8A with feature selection information and printer selection information, according to an example embodiment.

FIG. 8C shows print dialog 610 associated with application 812 in scenario 800 with feature selection information 850 and printer selection information 852, according to an example embodiment. Feature selection information 850 indicates that booklet and duplex print features were selected for use in printing the distributed print job of scenario 800; i.e., feature selection information 850 confirms that choice 846 related to the booklet print device feature and choice 848 related to the duplex print device feature were made. Printer selection information 852 indicates print devices 820*a* and 820*b* were selected to print the distributed print job of scenario 800, and therefore, have the features indicated as part of feature selection information 850.

FIG. 8C also shows status of the distributed print job of scenario 800 while in the process of being printed. Dialog 610 indicates that print device 820*a* has printed 22 of 40 total pages of its print job portion, print device 82*b* has printed 11 of 40 total pages of its print-job portion, and that a total of 33 out of 80 pages in the distributed print job of scenario 800 have been printed.

Figure 8D:
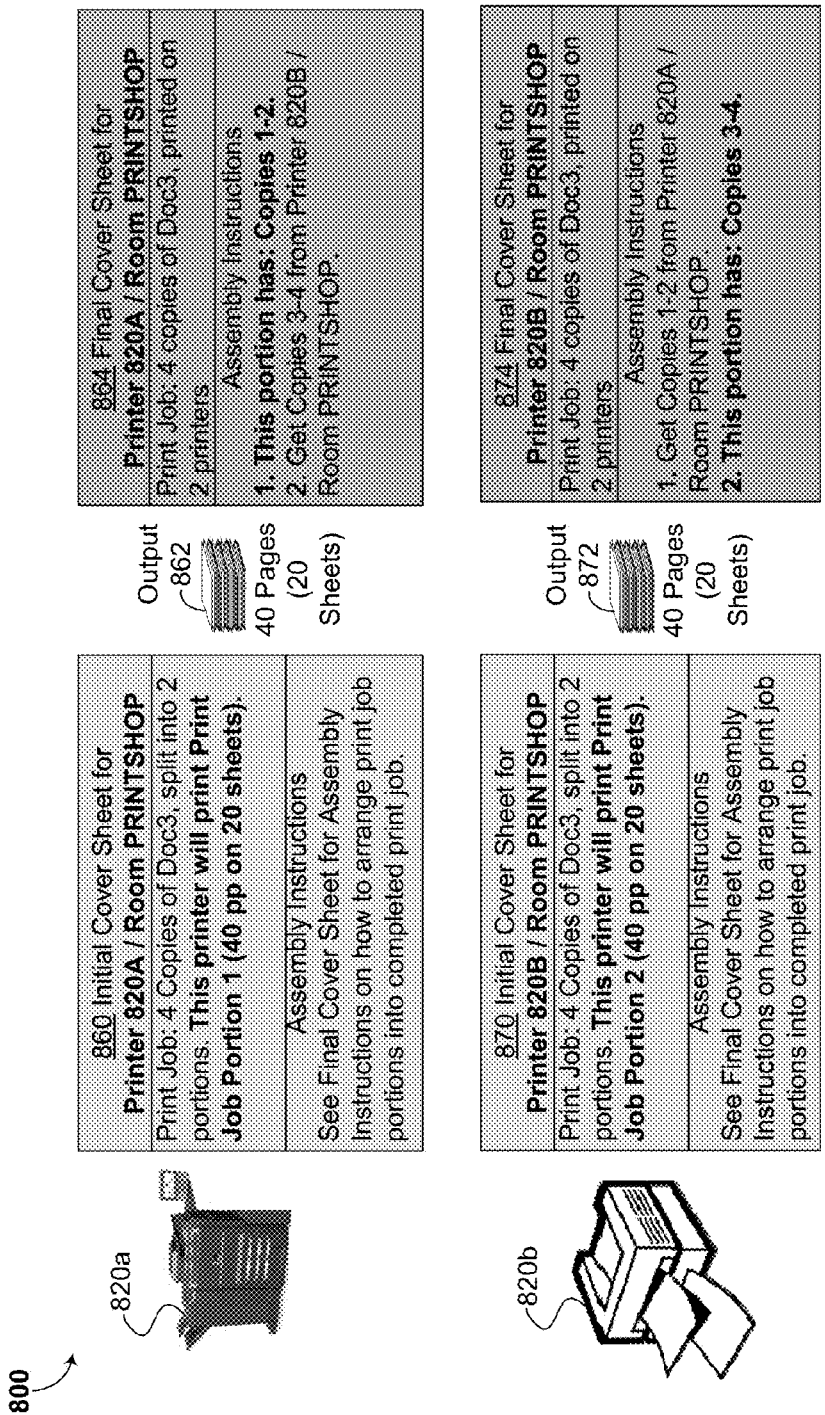
FIG. 8D illustrates print device output in the scenario of FIG. 8A, according to an example embodiment.

Scenario 800 continues with print devices 820*a* and 820*b* each successfully printing their respective print job portions of the distributed print job of scenario 800. FIG. 8D illustrates print device output for the distributed print job of scenario 800, according to an example embodiment.

FIG. 8D shows that print devices 820*a* and 820*b* each printed 42 pages as part of scenario 800—the 42 pages include an initial cover sheet, 40 pages of output for a print job portion of the distributed print job of scenario 800, and a final cover sheet.

Both initial cover sheet 860 and final cover sheet 864 of FIG. 8D identify printer "820A" located in "Room PRINTSHOP" as printing a print-job portion, indicate that the distributed print job of scenario 800 includes "4 copies of Doc3", and have "Assembly Instructions". Initial cover sheet 860 has information available at the onset of printing the distributed print job of scenario 800; e.g., the distributed print job was "split into 2 portions", print device 820*a*"will print Print Job Portion 1 (40 pp on 20 sheets)" indicating duplex printing, and has initial assembly instructions that refer to final cover sheet 864. FIG. 8D shows that final cover sheet 864 includes information available after printing the distributed print job of scenario 800, including assembly instructions for the distributed print job of scenario 800 that indicate "[t]his portion" printed by print device 820*a* includes "Copies 1-2" and that "Copies 3-4" are available "from Printer 820B" in "Room PRINTSHOP".

Additionally, both initial cover sheet 870 and final cover sheet 874 of FIG. 8D identify printer "820B" located in "Room PRINTSHOP" as printing a print job portion, indicate that the distributed print job of scenario 800 includes "4 copies of Doc3", and have "Assembly Instructions". Initial cover sheet 870 has information available at the onset of printing the distributed print job of scenario 800; e.g., the distributed print job was "split into 2 portions", print device 820*b*"will print Print Job Portion 2 (40 pp on 20 sheets)" indicating duplex printing, and has initial assembly instructions that refer to final cover sheet 874. FIG. 8D shows that final cover sheet 874 includes information available after printing the distributed print job of scenario 800, including assembly instructions for the distributed print job of scenario 800 that indicate that "Copies 1-2" are available "from Printer 820A" in "Room PRINTSHOP" and that "[t]his portion" printed by print device 820*b* includes "Copies 3-4."

Each of the initial cover sheets printed by print devices 820*a* and 820*b* for the distributed print job of scenario 800 are printed in a light grey color, and each of the final cover sheets printed by print devices 820*a* and 820*b* for the distributed print job of scenario 800 are printed in a dark grey color. In many cases, print job output is printed on white paper, and so cover sheets printed on colored paper allow for ready cover sheet identification. In other scenarios, initial and/or final cover sheets can be printed on other colors of paper than grey.

V. Example Methods of Operation

Figure 9:
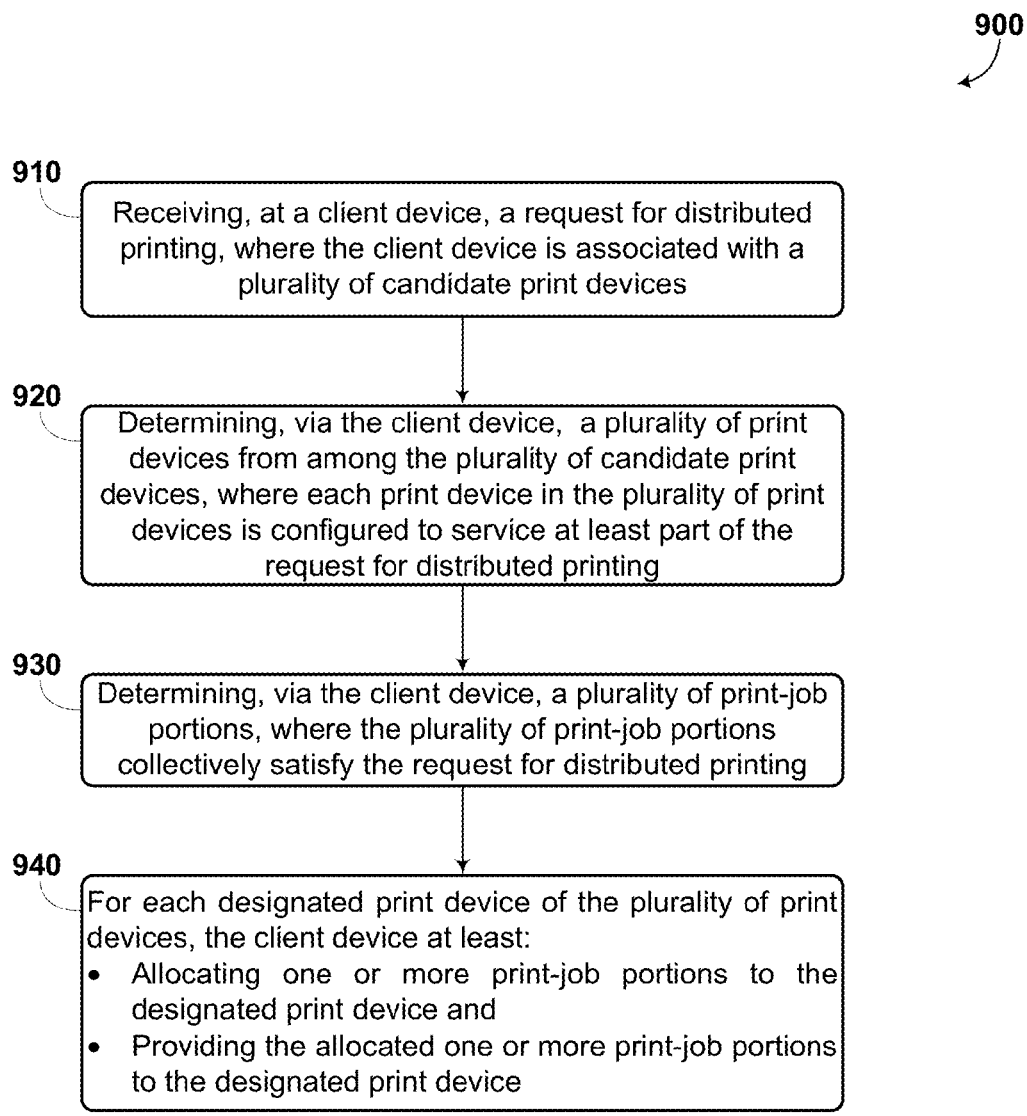
FIG. 9 is a flow diagram illustrating a method, according to an example embodiment.

FIG. 9 is a flow diagram illustrating a method, according to an example embodiment.

Method 900 can be carried out by a client device, such as one or more of client devices 110*a*-110*i*, computing device 200 configured as a client device, and client devices 220, 510, and 810.

Method 900 can begin at block 910, where a client device can receive a request for distributed printing, where the client device is associated with a plurality of candidate print devices, such as discussed above in the context of at least FIGS. 3-8D.

At block 920, the client device can determine a plurality of print devices from among the plurality of candidate print devices, where each print device in the plurality of print devices can be configured to service at least part of the request for distributed printing, such as discussed above in the context of at least FIGS. 3-8D.

In some embodiments, the client device determining the plurality of print devices can include the client device determining one or more printing options related to the request for distributed printing. Then, for a designated print device of the plurality of candidate print devices, the client device can determine whether the designated print device is configured to support the one or more printing options, and after determining that the designated print device is configured to support the one or more printing options, the client device can add the designated print device to the plurality of candidate print devices, such as discussed above in the context of at least FIGS. 3, 4, and 8A-8D.

At block 930, the client device can determine a plurality of print job portions that collectively satisfy the request for distributed printing, such as discussed above in the context of at least FIGS. 3-8D.

In some embodiments, the request for distributed printing can include a request for printing a plurality of copies of a document. Then, determining the plurality of print job portions can include determining a number of copies of the document for a designated print job portion of the plurality of print job portions, such as discussed above in the context of at least FIGS. 3-5 and 7A-8D.

In other embodiments, the request for distributed printing can include a request for printing a plurality of pages. Then, determining the plurality of print job portions can include determining a number of pages for a designated print job portion of the plurality of print job portions, such as discussed above in the context of at least FIGS. 3-8D.

In still other embodiments, the client device determining the plurality of print-job portions can include: the client device determining a print-volume ratio for a particular print device of the plurality of print devices, where the print-volume ratio is based on a percentage of the request for distributed printing to be allocated to the particular print device, such as discussed above in the context of at least FIGS. 3-6G.

In even other embodiments, the client device determining the plurality of print job portions can include: the client device determining a particular number of pages per unit time for a particular print device of the plurality of print devices; determining a total number of pages per unit time for the plurality of print devices; and determining a page-volume ratio for the particular print device, where the page-volume ratio is based on a ratio of the particular number of pages per unit time to the total number of pages per unit time, such as discussed above in the context of at least FIGS. 3-8D.

At block 940, for each designated print device of the plurality of print devices, the client device can at least allocate one or more print job portions to the designated print device and provide the allocated one or more print job portions to the designated print device, such as discussed above in the context of at least FIGS. 3-8D.

In some embodiments, method 900 can further include: determining that an error has occurred while printing a print job portion on an erring print device, determining an alternative print device to replace the erring print device; and continuing to print the print job portion on the alternative print device, such as discussed above in the context of at least FIGS. 5-6G. In particular embodiments, determining that an error has occurred while printing the print-job portion can include: receiving a notification regarding the error at the client device and generating a display related to the notification using the client device, such as discussed above in the context of at least FIGS. 5-6G. In more particular embodiments, the display related to the notification can include a display of one or more alternative print devices. Then, determining the alternative print device can include receiving a selection of the alternative print device from among the one or more alternative print devices.

In other embodiments of method 900, a particular print job portion of the plurality of print job portions can include an instruction cover page. The instruction cover page can indicate information about one or more of: the particular print job portion, a print device used to print the particular print job portion, any other devices used to print the particular print job portion, and one or more print devices used to print the plurality of print job portions, such as discussed above in the context of at least FIGS. 6F, 6G, 7B, 7C, and 8D.

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
    selecting a printer driver at a client device among a plurality of printer drivers, wherein the client device is associated with a plurality of candidate print devices and the printer drivers correspond to respective candidate print devices;
    receiving, via the selected printer driver at the client device, a request for distributed printing;
    determining, via the client device, a plurality of print devices from among the plurality of candidate print devices, wherein each print device in the plurality of print devices is configured to service at least part of the request for distributed printing, and wherein determining the plurality of print devices comprises:
        determining one or more common features available to each print device in the plurality of candidate print devices, and
        determining that the plurality of print devices includes the plurality of candidate print devices if a print-job request utilizes the one or more common features;
    determining, via the selected printer driver at the client device, a plurality of print-job portions, wherein the plurality of print-job portions collectively satisfy the request for distributed printing; and
    for each designated print device of the plurality of print devices, the client device at least:
        allocating one or more print-job portions to the designated print device; and
        providing the allocated one or more print-job portions to the designated print device;
    determining that an error has occurred while printing a print-job portion on an erring print device;
    determining one or more alternative print devices to replace the erring print device by at least:
        receiving a selection of one or more selected alternative print devices from among the one or more alternative print devices when the request for distributed printing comprises a request for printing a plurality of copies of a document and the plurality of print-job portions comprises a number of copies of the document for a designated print-job portion of the plurality of print-job portions, and receiving a selection of one selected alternative print device from among the one or more alternative print devices when the request for distributed printing comprises a request for printing a plurality of pages of a document and the plurality of print-job portions comprises a number of pages of the document for a designated print-job portion of the plurality of print-job portions; and continuing to print the print-job portion on the one or more alternative print devices.

2. The method of claim 1, wherein the request for distributed printing comprises a request for printing a plurality of copies of a document, and wherein determining the plurality of print-job portions comprises determining a number of copies of the document for a designated print-job portion of the plurality of print-job portions.

3. The method of claim 1, wherein the request for distributed printing comprises a request for printing a plurality of pages, and wherein determining the plurality of print-job portions comprises determining a number of pages for a designated print-job portion of the plurality of print-job portions.

4. The method of claim 1,
wherein determining that the error has occurred while printing the print-job portion comprises:
receiving a notification regarding the error at the client device; and
generating a display related to the notification using the client device,
wherein the display related to the notification comprises a display of one or more alternative print devices, and
wherein determining the alternative print device comprises receiving a selection of the alternative print device from among the one or more alternative print devices.

5. The method of claim 1, wherein determining the plurality of print devices comprises:
determining one or more printing options related to the request for distributed printing;
for a designated print device of the plurality of candidate print devices, determining whether the designated print device is configured to support the one or more printing options; and
after determining that the designated print device is configured to support the one or more printing options, adding the designated print device to the plurality of candidate print devices.

6. The method of claim 1, wherein determining the plurality of print-job portions comprises:
determining a print-volume ratio for a particular print device of the plurality of print devices, wherein the print-volume ratio is based on a percentage of the request for distributed printing to be allocated to the particular print device.

7. The method of claim 1, wherein the determining the plurality of print-job portions comprises:
determining a particular number of pages per unit time for a particular print device of the plurality of print devices;
determining a total number of pages per unit time for the plurality of print devices; and
determining a page-volume ratio for the particular print device, where the page-volume ratio is based on a ratio of the particular number of pages per unit time to the total number of pages per unit time.

8. The method of claim 1, wherein a particular print-job portion of the plurality of print-job portions comprises an instruction cover page indicating information about the plurality of print-job portions, the information including: a print device used to print the particular print-job portion, any other devices used to print the particular print-job portion, and one or more print devices used to print the plurality of print-job portions.

9. The method of claim 8, wherein printing the instruction cover page includes printing a plurality of instruction cover pages that include an initial cover page and a final cover page,
wherein the initial cover page is printed on a first paper having a first color; and the final cover page is printed on a second paper having a second color, and
wherein the first color is different from the second color.

10. The method of claim 9, wherein the instruction cover page includes an instruction on how to assemble printed pages printed on the plurality of print devices.

11. The method of claim 10, wherein the instruction on how to assemble printed pages is printed on the final cover page, and the initial cover page includes information that the instruction on how to assemble printed pages is printed on the final cover page.

12. The method of claim 1, wherein the client device further includes a spooler and a port monitor, and wherein allocating one or more print-job portions to the designated print devices comprises:
splitting, at the selected printer driver, a distributed print job into the one or more print-job portions, the distributed print job according to the request for the distributed printing;
sending, from the selected printer driver, the one or more print-job portions to the spooler; and
sending, at the spooler, the one or more print-job portions to the port monitor, and
wherein the providing the allocated one or more print-job portions to the designated print device comprises sending, from the port monitor, the allocated one or more print-job portions to the designated print device.

13. The method of claim 1, wherein the client device further includes a spooler and a port monitor, and wherein allocating one or more print-job portions to the designated print devices comprises:
sending, from the selected printer driver, a distributed print job to the spooler, the distributed print job according to the request for the distributed printing;
sending, from the spooler, the distributed print job to the port monitor; and
splitting, at the port monitor, the distributed print job into the one or more print-job portions, and
wherein the providing the allocated one or more print-job portions to the designated print device comprises sending, from the port monitor, the allocated one or more print-job portions to the designated print device.

14. The method of claim 1, wherein determining the plurality of candidate print devices if the print-job request utilizes the one or more common features comprises: providing a listing of the one or more common features:
wherein the one or more common features for the candidate print devices include a feature related to a page description language; and
wherein determining one or more common features available to each print device in the plurality of candidate print devices comprises:

determining whether a particular candidate print device of the plurality of candidate print device was inoperative; and after determining that the particular candidate print device of the plurality of candidate print devices was inoperative, determining the one or more common features based on excluding one or more features of the particular candidate print device, and removing the particular candidate print device from the plurality of candidate print devices.

15. The method of claim 1, wherein the remaining print job portion is determined to be split into a plurality of print-job sub portions of a plurality of copies each, and
wherein each of the plurality of print devices except for the erring print device working on the distributed print job are further assigned one or more of the plurality of print-job sub portions.

16. A system comprising:
a plurality of candidate print devices; and
a client device comprising one or more processors and data storage, the one or more processors configured to execute a plurality of printer drivers corresponding to respective candidate print devices, and the data storage including computer-readable instructions that, when executed by the one or more processors, cause the client device to perform functions comprising:
receiving a selection of a printer driver among the plurality of printer drivers;
receiving, via the selected printer driver, a request for distributed printing;
determining a plurality of print devices from among the plurality of candidate print devices, wherein each print device in the plurality of print devices is configured to service at least part of the request for distributed printing, and wherein determining the plurality of print devices comprises:
determining one or more common features available to each print device in the plurality of candidate print devices, and
determining that the plurality of print devices includes the plurality of candidate print devices if a print-job request utilizes the one or more common features;
determining, via the selected printer driver, a plurality of print-job portions, wherein the plurality of print-job portions collectively satisfy the request for distributed printing; and
for a designated print device of the plurality of print devices, at least:
allocating one or more print-job portions to the designated print device; and
providing the allocated one or more print-job portions to the designated print device;
determining that an error has occurred while printing a print-job portion on an erring print device;
determining one or more alternative print devices to replace the erring print device by at least:
receiving a selection of one or more selected alternative print devices from among the one or more alternative print devices when the request for distributed printing comprises a request for printing a plurality of copies of a document and the plurality of print-job portions comprises a number of copies of the document for a designated print-job portion of the plurality of print-job portions, and
receiving a selection of one selected alternative print device from among the one or more alternative print devices when the request for distributed printing comprises a request for printing a plurality of pages of a document and the plurality of print-job portions comprises a number of pages of the document for a designated print-job portion of the plurality of print-job portions; and
continuing to print the print-job portion on the one or more alternative print devices.

17. The system of claim 16,
wherein determining that the error has occurred while printing the print-job portion comprises:
receiving a notification regarding the error at the client device; and
generating a display related to the notification using the client device,
wherein the display related to the notification comprises a display of one or more alternative print devices, and
wherein determining the alternative print device comprises receiving a selection of the alternative print device from among the one or more alternative print devices.

18. The system of claim 16, wherein determining the plurality of print devices comprises:
determining one or more printing options related to the request for distributed printing;
for a designated print device of the plurality of candidate print devices, determining whether the designated print device is configured to support the one or more printing options; and
after determining that the designated print device is configured to support the one or more printing options, adding the designated print device to the plurality of candidate print devices.

19. The system of claim 16, wherein determining the plurality of print-job portions comprises:
determining a print-volume ratio for a particular print device of the plurality of print devices, wherein the print-volume ratio is based on a percentage of the request for distributed printing to be allocated to the particular print device.

20. The system of claim 16, wherein the determining the plurality of print-job portions comprises:
determining a particular number of pages per unit time for a particular print device of the plurality of print devices;
determining a total number of pages per unit time for the plurality of print devices; and
determining a page-volume ratio for the particular print device, where the page-volume ratio is based on a ratio of the particular number of pages per unit time to the total number of pages per unit time.

21. An article of manufacture including computer-readable instructions that, when executed by one or more processors that are configured to execute a plurality of printer drivers a plurality of printer drivers of a client device associated with a plurality of candidate print devices, the plurality of printer drivers corresponding to the respective candidate print devices, cause the client device to perform functions comprising:
receiving a selection of a printer driver among the plurality of printer drivers;
receiving, via the selected printer driver, a request for distributed printing;
determining, via the selected printer driver, a plurality of print devices from among the plurality of candidate print devices, wherein each print device in the plurality of print devices is configured to service at least part of the request for distributed printing, and wherein determining the plurality of print devices comprises:
  determining one or more common features available to each print device in the plurality of candidate print devices, and
  determining that the plurality of print devices includes the plurality of candidate print devices if a print-job request utilizes the one or more common features;
determining a plurality of print-job portions, wherein the plurality of print-job portions collectively satisfy the request for distributed printing; and
for a designated print device of the plurality of print devices, at least:
  allocating one or more print-job portions to the designated print device; and
  providing the allocated one or more print-job portions to the designated print device;
determining that an error has occurred while printing a print-job portion on an erring print device;
determining one or more alternative print devices to replace the erring print device by at least:
  receiving a selection of one or more selected alternative print devices from among the one or more alternative print devices when the request for distributed printing comprises a request for printing a plurality of copies of a document and the plurality of print-job portions comprises a number of copies of the document for a designated print-job portion of the plurality of print-job portions, and
  receiving a selection of one selected alternative print device from among the one or more alternative print devices when the request for distributed printing comprises a request for printing a plurality of pages of a document and the plurality of print-job portions comprises a number of pages of the document for a designated print-job portion of the plurality of print-job portions; and
continuing to print the print-job portion on the one or more alternative print devices.

* * * * *